(12) United States Patent  (10) Patent No.: US 8,315,773 B2
Ishikawa et al.  (45) Date of Patent: Nov. 20, 2012

(54) BRAKE FORCE MAINTAIN CONTROL DEVICE

(75) Inventors: Toshimi Ishikawa, Anjo (JP); Satoshi Naganawa, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 685 days.

(21) Appl. No.: 12/505,170

(22) Filed: Jul. 17, 2009

(65) Prior Publication Data
US 2010/0030445 A1  Feb. 4, 2010

(30) Foreign Application Priority Data

Jul. 31, 2008  (JP) .................................. 2008-197761

(51) Int. Cl.
*B60T 7/12* (2006.01)
*B60T 10/00* (2006.01)
(52) U.S. Cl. ......................................... 701/78; 303/166
(58) Field of Classification Search .................... 701/81
See application file for complete search history.

(56) References Cited

U.S. PATENT DOCUMENTS

| | | | | |
|---|---|---|---|---|
| 4,852,950 A * | 8/1989 | Murakami | ..................... | 303/192 |
| 5,984,429 A * | 11/1999 | Nell et al. | ................... | 303/113.4 |
| 6,199,964 B1 * | 3/2001 | Ota et al. | ....................... | 303/192 |
| 6,246,944 B1 * | 6/2001 | Maruyama | ....................... | 701/70 |
| 6,364,436 B1 * | 4/2002 | Sawada | ......................... | 303/191 |
| 6,945,610 B1 * | 9/2005 | Mizutani et al. | ............ | 303/114.1 |
| 7,125,085 B2 * | 10/2006 | Ohsaki et al. | .............. | 303/119.1 |
| 7,484,816 B2 * | 2/2009 | Maruyama et al. | ........... | 303/191 |
| 2001/0038243 A1 * | 11/2001 | Isono | ......................... | 303/116.1 |
| 2002/0021045 A1 * | 2/2002 | Hada et al. | ................. | 303/113.1 |
| 2003/0137192 A1 * | 7/2003 | Hano et al. | ................. | 303/192 |
| 2004/0012250 A1 * | 1/2004 | Kuno et al. | .................... | 303/20 |
| 2004/0183373 A1 * | 9/2004 | Yonemura et al. | ............ | 303/191 |
| 2005/0067896 A1 * | 3/2005 | Kim et al. | ...................... | 303/191 |
| 2005/0140208 A1 * | 6/2005 | Ji | .................................. | 303/192 |
| 2006/0108868 A1 * | 5/2006 | Ohsaki et al. | ................ | 303/154 |
| 2006/0284482 A1 * | 12/2006 | Yang | ............................. | 303/191 |
| 2007/0050120 A1 * | 3/2007 | Tabata et al. | .................... | 701/80 |
| 2007/0182243 A1 * | 8/2007 | Osborn et al. | ................. | 303/10 |

FOREIGN PATENT DOCUMENTS

| | | | |
|---|---|---|---|
| JP | 2002-067902 A | | 3/2002 |
| JP | 2007-112208 A | | 5/2007 |
| JP | 2007112208 A | * | 5/2007 |

* cited by examiner

*Primary Examiner* — Shelley Chen
(74) *Attorney, Agent, or Firm* — Buchanan Ingersoll & Rooney PC

(57) ABSTRACT

A brake force maintain control device for a vehicle determines whether the vehicle is in a rapidly-pressed state. The rapidly-pressed state is a state in which the brake pedal of the vehicle has been further pressed rapidly. While the vehicle is in the rapidly-pressed state, the brake force maintain control device allows the brake force maintain control to start if a condition for starting the brake force maintain control is satisfied. Therefore, it is possible to prevent the brake force maintain control from being needlessly executed even though the driver does not have an intention of executing it.

19 Claims, 15 Drawing Sheets

FIG. 3

|  | NOKMAL BRAKING OPERATION | START AID CONTROL |
|---|---|---|
| SMCF | OFF (OPEN) | ON (CLOSE) |
| SREC | OFF (OPEN) | ON (CLOSE) |
| STR | OFF (CLOSE) | OFF (CLOSE) |
| SREA | OFF (CLOSE) | OFF (CLOSE) |
| SFRH、SFLH | OFF | OFF |
| SFRR、SFLR | OFF | OFF |
| SRRH、SRLH | OFF | OFF |
| SRRR、SRLR | OFF | OFF |

BRAKE FORCE MAINTAIN CONTROL DEVICE

CROSS REFERENCE TO RELATED APPLICATION

This application is based on and incorporates herein by reference Japanese patent applications No. 2008-197761 filed on Jul. 31, 2008.

FIELD OF THE INVENTION

The present invention relates to a brake force maintain control device for performing brake force maintain control which prevents a vehicle from slipping down on a slope by maintaining a brake force generated by operation of a brake pedal even after the vehicle stops.

BACKGROUND OF THE INVENTION

In JP 2007-112208A, a device is disclosed which prevents a vehicle from slipping down on a slope by maintaining a brake force generated on each of the wheels by operation of a brake pedal, even after the operation on the brake pedal is ended. This device starts a control when the brake pedal is pressed down and a fluid pressure in a master cylinder (hereinafter referred to as a master cylinder pressure) exceeds a threshold after the vehicle stops. In the control, the device maintains the brake force by closing a valve connecting the master cylinder with the wheel cylinder. In other words, the valve is turned on while the brake pedal is being pressed down.

SUMMARY OF THE INVENTION

However, if the brake force maintain control is executed simply when the master cylinder pressure exceeds a threshold, the brake force maintain control is sometimes needlessly executed even in an occasion that a driver does not have an intention of executing the brake force maintain control. An example of such occasion is that the driver unintentionally increases the pressing force on the brake pedal gradually after the vehicle stops.

It is therefore an object of the present invention to provide a brake force maintain control device which can prevent the brake force maintain control from starting needlessly even if there is no intention of executing the brake force maintain control.

In an aspect of the present invention, a brake force maintain control device for a vehicle comprises: a pressure obtaining means for obtaining a master cylinder pressure which is generated in a master cylinder in accordance with a pressing force applied to a brake pedal of the vehicle; a stop determination means for determining whether the vehicle has stopped; a rapid pressing determination means for making a rapidly-pressed determination as to whether the vehicle is in a rapidly-pressed state based on an increase rate of the master cylinder pressure, wherein the rapidly-pressed state is a state in which the brake pedal has been further pressed rapidly; and an allowance determination means for allowing execution of a brake force maintain control when both of first and second conditions are satisfied, the first condition being that the rapid pressing determination means determines that the vehicle is in the rapidly-pressed state after the stop determination means determines that the vehicle has stopped, the second condition being that the master cylinder pressure obtained by the pressure obtaining means is larger than a predetermined value, wherein the brake force maintain control is for maintaining brake fluid pressures generated at wheel cylinders for wheels of the vehicle.

As described above, the brake force maintain control device determines whether the vehicle is in the rapidly-pressed state in which the brake pedal has been further pressed rapidly. When the vehicle is in the rapidly-pressed state, the brake force maintain control device makes a determination to allow the brake force maintain control to start if a condition for allowing the brake force maintain control to start is satisfied. Therefore, it is possible to prevent the brake force maintain control from being needlessly executed even though the driver does not have an intention of executing it.

The rapid pressing determination means may keep the rapidly-pressed determination affirmative for a first predetermined time once the rapidly-pressed determination changes from negative to affirmative. In this case, the second condition may be that the master cylinder pressure obtained by the pressure obtaining means has been continuously larger than the predetermined value for a second predetermined time which is shorter than the first predetermined time.

The rapid pressing determination means may define a rapidly-pressed threshold so that the rapidly-pressed threshold becomes smaller as the pressing force applied to the brake pedal becomes larger. In this case, the rapid pressing determination means may determine that the vehicle is in the rapidly-pressed state when the increase rate of the master cylinder pressure is larger than the rapidly-pressed threshold.

When a large pressing force is being applied to the brake pedal, there is only a small additional amount of pressing force which can be further applied to the brake pedal. Therefore in this case, the increase rate of the master cylinder may become small. However, it is possible to determine whether the brake pedal is being pressed down quickly in a manner suitable for the pressing force applied to the brake pedal if the rapidly-pressed threshold is determined according to the pressing force.

The brake force maintain control device may further comprise a start determination means for determining to start executing the brake force maintain control on detecting that the pressing force applied to the brake pedal is reduced after the allowance determination means allows execution of the brake force maintain control.

Thus the brake force maintain control device divides conditions for executing brake force maintain control into two parts. More specifically, the brake force maintain control device allows the brake force maintain control to start in the case that the brake pedal is pressed further than it is pressed when the vehicle is stopped, and after that, the brake force maintain control device actually executes the brake force maintain control in the case that the pressing force on the brake pedal is reduced.

Thus, the brake force maintain control is not executed until the pressing force on the brake pedal is reduced, and the brake force maintain control is executed when the pressing force on the brake pedal is reduced. Therefore, it is possible to prevent the driver from feeling as if he/she is pressing a rigid board when he/she further presses the brake pedal. In other words, it is possible to prevent the driver from feeling as if he/she is pressing a rigid board and to give a better brake feeling to the driver in executing the brake force maintain control for maintaining, after stopping the vehicle, the brake force generated by the operation of the brake pedal.

On the other hand, the brake force maintain control device may start executing the brake force maintain control when the allowance determination means allows execution of the brake force maintain control. In other words, the brake force maintain control device may start executing the brake force maintain control right after allowing execution of the brake force maintain control when the pressing force on the brake pedal increases the master cylinder pressure.

The brake force maintain control device may further comprises a memorizing means for memorizing, as a stored value, the master cylinder pressure obtained by the pressure obtaining means when the vehicle stops. In this case, the start determination means may detect reduction of the pressing force on the brake pedal based on the stored value and the master cylinder pressure, the master cylinder pressure being obtained after the stored value is memorized.

Thus, the brake force maintain control device can memorize the master cylinder pressure as the stored value when the vehicle stops. In addition, the brake force maintain control device can detect reduction of the pressing force on the brake pedal based on the stored value and the master cylinder pressure.

The second condition may be that the master cylinder pressure obtained by the pressure obtaining means is larger than a sum of the stored value and a first threshold. In this case, the start determination means may detect the reduction of the pressing force on the brake pedal by detecting that the master cylinder pressure obtained by the pressure obtaining means becomes smaller than a sum of the stored value and a second threshold, the second threshold being smaller than the first threshold.

Thus, it can be detected that the brake pedal is further pressed when the master cylinder pressure becomes larger than the sum of the stored value and the first threshold. In addition, it can be detected that the pressing force on the brake pedal is reduced when the master cylinder pressure becomes smaller than the sum of the stored value and a second threshold, the second threshold being smaller than the first threshold.

The second condition may be that the master cylinder pressure obtained repeatedly once per a control cycle by the pressure obtaining means is larger than a sum of the stored value and a first threshold. In this case, the start determination means may pass a signal of the obtained master cylinder pressure through a first filter having a first cutoff frequency. In addition, the start determination means may calculate a first estimate for wheel cylinder pressures based on the signal of the obtained master cylinder pressure which has been passed through the first filter. Furthermore, the start determination means may detect the reduction of the pressing force on the brake pedal by detecting that the first estimate becomes smaller than a sum of the stored value and an anti-containment threshold, the anti-containment threshold being smaller than the first threshold.

Thus, the brake force maintain control device causes the signal indicating the master cylinder pressure obtained by the pressure obtaining means to pass through the first filter, wherein the signal. The first filter is designed so that the signal of the master cylinder pressure which has passed through the first filter changes gently with slower response in accordance with the change of the wheel cylinder pressures. Therefore, the brake force maintain control device can calculate the first estimate for the wheel cylinder pressures by passing the master cylinder pressure through the first filter. Thus, it is possible to prevent the actual wheel cylinder pressures from becoming larger than the desired wheel cylinder pressure because the brake force maintain control device determines whether to start the brake force maintain control based on the first estimate. In other words, it is possible to prevent the containment phenomenon in which excessive wheel cylinder pressures are remained.

The start determination means may pass the signal of the obtained master cylinder pressure through a second filter having a second cutoff frequency, the second cutoff frequency being larger than the first cutoff frequency. In this case, the start determination means may calculate a second estimate for the wheel cylinder pressures based on the signal of the obtained master cylinder pressure which has been passed through the second filter. Moreover, the start determination means may detect the reduction of the pressing force on the brake pedal by detecting that the second estimate becomes smaller than a sum of the stored value and an anti-sliding threshold, the anti-sliding threshold being smaller than the anti-containment threshold.

Thus, the brake force maintain control device can calculate a second estimate for the wheel cylinder pressures by passing the signal of the master cylinder pressure through the second filter, wherein the second estimate decreases more slowly than the raw data of the master cylinder pressure and also decreases more quickly (i.e. in more quick response to the raw data of the master cylinder pressure) than the first estimate for the wheel cylinder pressures. Therefore, it is possible to generate the wheel cylinder pressures surely sufficient for preventing the vehicle from sliding down on a slope because the brake force maintain control device determines whether to start the brake force maintain control based on the second estimate.

The second condition may be that the master cylinder pressure obtained by the pressure obtaining means is larger than a sum of the stored value and a first threshold. In this case, the start determination means may pass a signal of the obtained master cylinder pressure through a variable filter having a variable cutoff frequency; the variable cutoff frequency changing depending on temperature of brake fluid of the vehicle. In addition, the start determination means may calculate an estimate for wheel cylinder pressures based on the signal of the obtained master cylinder pressure which has been passed through the variable filter. Moreover, the start determination means may detect the reduction of the pressing force on the brake pedal by detecting that the estimate becomes smaller than a sum of the stored value and a second threshold, the second threshold being smaller than the first threshold.

Thus, the brake force maintain control device can use the variable filter having the variable cutoff frequency which changes depending on the temperature of the brake fluid. Therefore, the estimate for the wheel cylinder pressures can be calculated wherein the estimate changes in variable response to the decrease of the master cylinder pressure. The variable response matches the temperature (viscous resistance) of the brake fluid. With this operation, the brake force maintain control device can calculate correct estimate for the wheel cylinder pressures corresponding to the temperature (viscous resistance) of the brake fluid by passing the detection signal of the master cylinder to a single filter. As a result, by determining whether to start the brake force maintain control based on the estimate for the wheel cylinder pressures, it becomes possible to generate the wheel cylinder pressures so as to prevent the containment phenomenon in which an excessive wheel cylinder pressures are remained and so as to generate the wheel cylinder pressures at least sufficient for preventing the vehicle from sliding down on a slope.

The memorizing means may update the stored value in accordance with decrease of the master cylinder pressure when the master cylinder pressure decreases while the vehicle is not moving.

Thus, the stored value can be updated in accordance with decrease of the master cylinder pressure. Therefore, the brake force maintain control can be properly executed even if the stored value once becomes equal to the master cylinder pressure when the brake pedal BP is pressed down with a strong force which makes it difficult for the driver to press the brake pedal further.

The memorizing means may update the stored value to a sum of the master cylinder pressure and a third threshold when the stored value is larger than the sum of the master cylinder pressure and the third threshold.

Thus, the stored value does not become insufficiently small even if it is updated in accordance with the decrease of the master cylinder pressure. Therefore, the stored value always corresponds to a wheel cylinder pressure necessary for keeping the vehicle standing still (i.e. not moving) and it is accordingly possible to prevent the vehicle from sliding down on a slope.

For example, the third threshold may become larger as a return speed becomes larger, the return speed being a speed of reduction of pressing force on the brake pedal. More specifically, the third threshold may be determined to become larger as the return speed becomes larger. The reason is as follows. Although the master cylinder pressure decreases faster as the return speed becomes larger, the differences between the master cylinder pressure and the wheel cylinder pressures become larger as the return speed becomes larger. Therefore, it may take longer time until the vehicle starts running as the return speed becomes larger.

BRIEF DESCRIPTION OF THE DRAWINGS

The invention, together with additional objective, features and advantages thereof, will be best understood from the following description, the appended claims and the accompanying drawings. In the drawings:

FIG. 3 is a table showing operating states of various valves in a normal braking operation and a vehicular start aid control;

DETAILED DESCRIPTION OF THE EMBODIMENTS

First Embodiment

Figure 1:
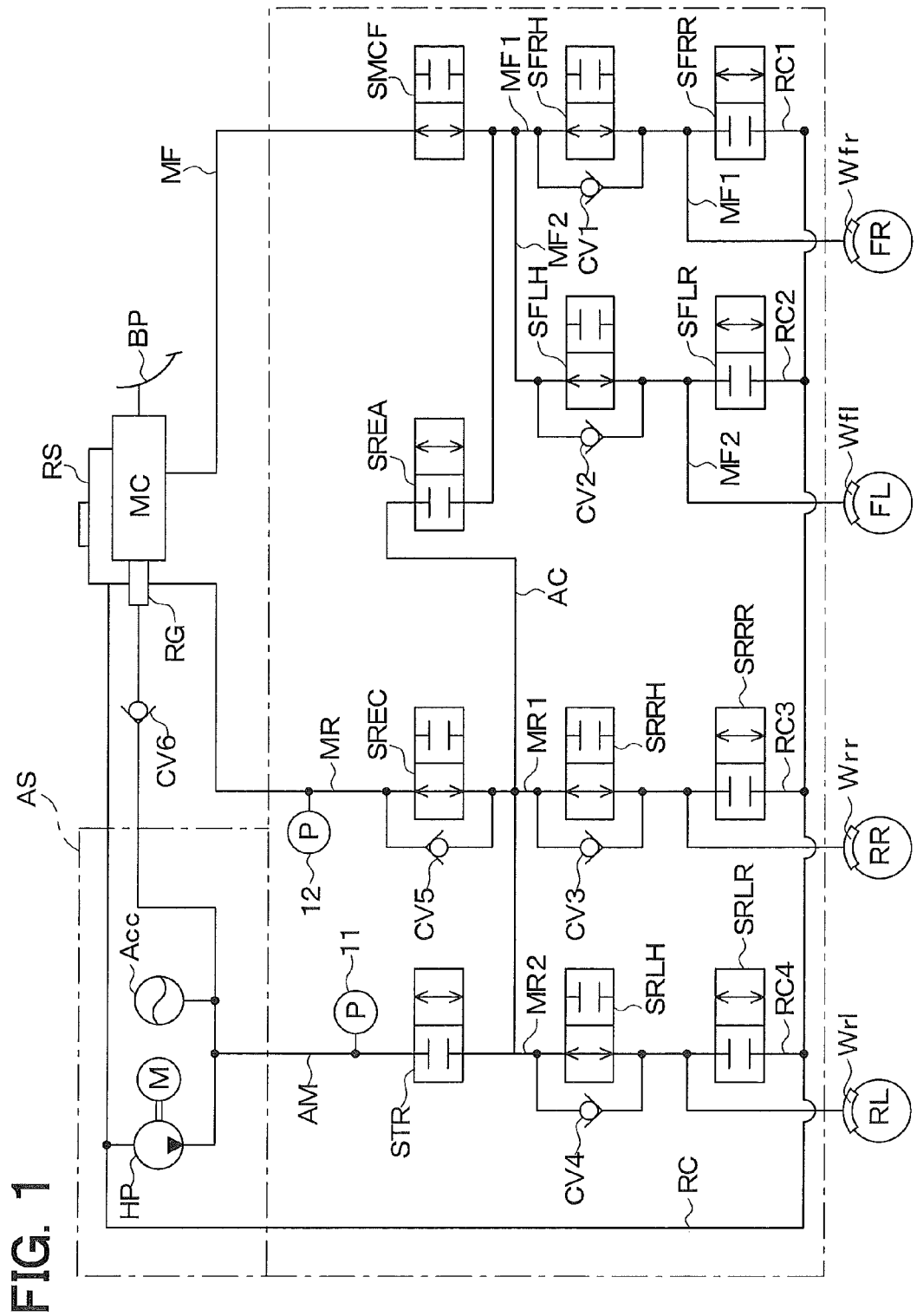
FIG. 1 is a schematic diagram showing a structure of a hydraulic circuit of a vehicular brake control device serving as a vehicular start aid control device according to a first embodiment of the present invention.

Hereinafter, a vehicular brake control device is described which serves as an example of a brake force maintain control device according to an embodiment of the present invention. The vehicular brake control device performs a vehicular start aid control. The vehicular start aid control helps a vehicle start moving and serves as an embodiment of a brake force maintain control for maintaining the brake force of the vehicle. FIG. 1 is a schematic diagram showing a structure of a hydraulic circuit of the vehicular brake control device according to the present embodiment. The configuration of the vehicular brake control device is described with reference to FIG. 1.

The vehicular brake control device includes a hydraulic brake booster system. As shown in FIG. 1, the hydraulic brake booster system includes a master cylinder MC and a regulator RG which are driven in accordance with operation of a brake pedal BP. A supplemental fluid pressure source AS is connected with the regulator RG. They are connected with a low pressure reservoir RS as is the master cylinder MC.

The supplemental fluid pressure source AS includes a fluid pressure pump HP and an accumulator Acc. The fluid pressure pump HP, which is driven by an electric motor M, sucks and discharges brake fluid in the low pressure reservoir RS. The brake fluid discharged by the fluid pressure pump HP is supplied to the accumulator Acc so that the accumulator Acc stores pressure. Therefore, a brake fluid pressure within a predetermined range between a lower limit pressure and an upper limit pressure is generated constantly at the supplemental fluid pressure source AS, wherein the lower limit pressure and the upper limit pressure are determined by characteristics of the fluid pressure pump HP and the accumulator Acc. The pressure outputted by the supplemental fluid pressure source AS is inputted into the regulator RG as a dynamic pressure. Accordingly, a regulator fluid pressure is generated at the regulator RG and a master cylinder pressure is adjusted.

The electric motor M is activated in response to that the brake liquid pressure (brake fluid pressure) in the accumulator Acc becomes smaller than the predetermined lower limit. In addition, the electric motor M is deactivated in response to that the brake fluid pressure in the accumulator Acc becomes larger than the predetermined upper limit. The brake fluid pressure stored in the accumulator Acc in this way is supplied as an output fluid pressure to the regulator RG through a check valve CV6.

The regulator RG imports the fluid pressure outputted by the supplemental fluid pressure source AS, uses the fluid pressure outputted by the master cylinder MC as a pilot pressure, and adjusts the regulator fluid pressure so that it becomes proportional to the pilot pressure. The regulator fluid pressure is detected, for example, by a pressure sensor 12 described later and is constantly maintained within a predetermined range. The basic structure of the regulator RG is not described herein since it is well-known.

The hydraulic circuit of the vehicular brake control device includes a conduit MF serving as a first conduit for front wheels of the vehicle. The conduit MF constitutes a static pressure conduit which connects the master cylinder MC with each of wheel cylinders Wfr and Wfl (serving as first and second wheel cylinders) for the front wheels FR and FL so that the master cylinder pressure is transmitted to the wheel cylinders Wfr and Wfl. A solenoid on-off valve SMCF serving as a first solenoid on-off valve is located in the conduit MF and is composed of a two-port and two-position valve. The solenoid on-off valve SMCF controls communication and shutoff of the conduit MF.

At the wheel cylinders Wfl, Wfr side of the solenoid on-off valve SMCF, the conduit MF is connected with two diverging conduits MF1 and MF2 in which a booster valve SFRH and a booster valve SFLH are located, respectively. A conduit RC1 branches off from the conduit MF1 at a branching point between the booster valve SFRH and the wheel cylinder Wfr and connects the branching point with the low pressure reservoir RS. In a similar way, a conduit RC2 branches off from the conduit MF2 at a branching point between the booster valve SFLH and the wheel cylinder Wfl and connects the branching point with the low pressure reservoir RS. Pressure reducing valves SFRR and SFLR are located in the conduits RC1 and RC2, respectively. The pressure reducing valves SFRR and SFLR control communication and shutoff of the conduits RC1 and RC2, respectively.

In a non-operational mode in which electric current is not supplied to a solenoid of the solenoid on-off valve SMCF, the master cylinder MC is communicated with each of the wheel cylinders Wfr and Wfl of the front wheels FR and FL through the conduits MF, MF1 and MF2. In an operational mode in which electric current is supplied to the solenoid of the solenoid on-off valve SMCF, the master cylinder MC is shut off from the wheel cylinders Wfr and Wfl.

The hydraulic circuit of the vehicular brake control device further includes a conduit MR serving as a second conduit for rear wheels of the vehicle. The conduit MR constitutes a dynamic pressure conduit which connects the regulator RG with each of wheel cylinders Wrr and Wrl (serving as third and fourth wheel cylinders) for the rear wheels RR and RL so that the regulator fluid pressure is transmitted to the wheel cylinders Wrr and Wrl. A solenoid on-off valve SREC serving as a second solenoid on-off valve is located in the conduit MR and is composed of a two-port and two-position valve. The solenoid on-off valve SREC controls communication and shutoff of the conduit MR.

In a non-operational mode in which electric current is not supplied to a solenoid of the solenoid on-off valve SREC, the regulator RG is communicated with each of the wheel cylinders Wrr and Wrl of the rear wheels RR and RL through the conduit MR. In an operational mode in which electric current is supplied to the solenoid of the solenoid on-off valve SREC, the regulator RG is shut off from the wheel cylinders Wrr and Wrl.

At the wheel cylinders Wrl, Wrr side of the solenoid on-off valve SREC, the conduit MR is connected with two diverging conduits MR1 and MR2 in which a booster valve SRRH and a booster valve SRLH are located, respectively. A conduit RC3 branches off from the conduit MR1 at a branching point between the booster valve SRRH and the wheel cylinder Wrr and connects the branching point with the low pressure reservoir RS. In a similar way, a conduit RC4 branches off from the conduit MR2 at a branching point between the booster valve SRLH and the wheel cylinder Wrl and connects the branching point with the low pressure reservoir RS. Pressure reducing valves SRRR and SRLR are located in the conduits RC3 and RC4, respectively. The pressure reducing valves SRRR and SRLR control communication and shutoff of the conduits RC3 and RC4, respectively.

The supplemental fluid pressure source AS is connected through a conduit AM (serving as a third conduit) with the downstream side of the solenoid on-off valve SREC in the conduit MR. In other words, the supplemental fluid pressure source AS is connected with the wheel cylinders Wfr, Wfl side of the solenoid on-off valve SREC. A solenoid on-off valve STR (serving as a third solenoid on-off valve) is located in the conduit AM and is composed of a two-port and two-position valve. The solenoid on-off valve STR controls communication and shutoff of the conduit AM.

In a non-operational mode in which electric current is not supplied to a solenoid of the solenoid on-off valve STR, the supplemental fluid pressure source AS is shut off from the wheel cylinders Wrr and Wrl. In an operational mode in which electric current is supplied to a solenoid of the solenoid on-off valve STR, the supplemental fluid pressure source AS is communicated thorough the conduit AM with each of the wheel cylinders Wrr and Wrl for the rear wheels RR and RL.

A point in the conduit MR between the solenoid on-off valve SREC and the booster valves SRRH and SRLH is connected through a conduit AC (serving as a fourth conduit) with a point in the conduit MF between the solenoid on-off valve SMCF and the booster valves SFRH and SFLH. A solenoid on-off valve SREA is located in the conduit AC and is composed of a two-port and two-position valve. The solenoid on-off valve SREA controls communication and shutoff of the conduit AC.

Check valves CV1 to CV4 are connected respectively in parallel to the booster valves SFRH, SFLH, SRRH, and SRLH and only allow brake fluid to flow from the downstream side (the wheel cylinder Wfr, Wfl, Wrr, Wrl side) to the upstream side of the booster valves SFRH, SFLH, SRRH, and SRLH, respectively. In addition, a check valve CV5 is connected in parallel with the solenoid on-off valve SREC. Even when the solenoid on-off valve SREC is closed, the check valve CV5 allows brake fluid to flow only from the upstream side (the regulator RG side) to the downstream side of the solenoid on-off valve SREC if the brake operation of the driver generates a sufficiently large pressure.

The vehicular brake control device also includes pressure sensors 11 and 12 for detecting brake fluid pressures at positions in the hydraulic circuit. The pressure sensor 11 is used to detect the brake fluid pressure stored in the accumulator Acc. The pressure sensor 12 is located at the upstream side of the solenoid on-off valve SREC in the conduit MR and is used to detect the master cylinder pressure generated at the master cylinder MC by detecting the pressure (regulator pressure) at the regulator RG. The master cylinder pressure can be detected by detecting the regulator pressure since the regulator pressure is basically equal to the master cylinder pressure.

Figure 2:
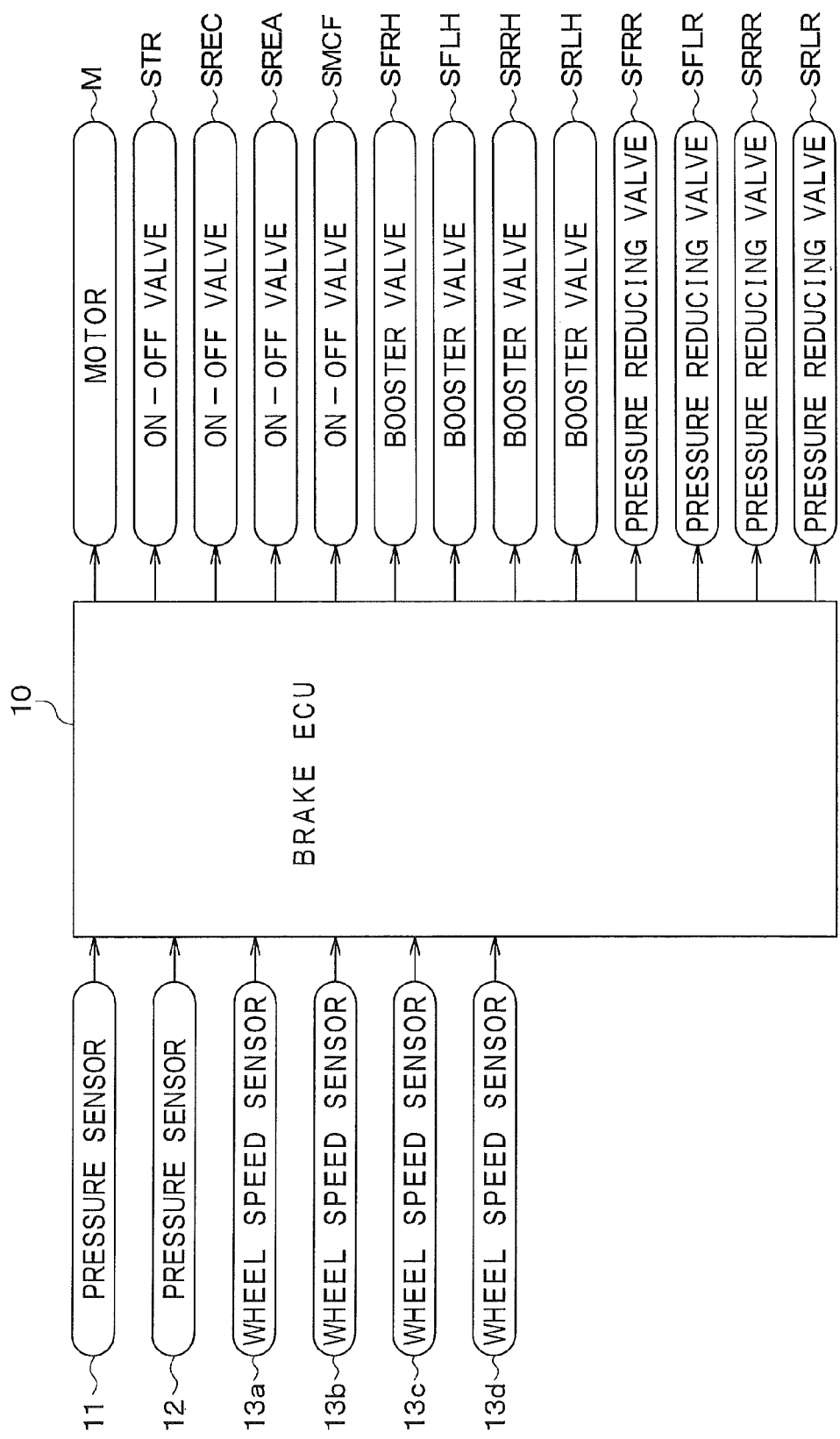
FIG. 2 is a block diagram showing inputs and outputs of various signals at a brake ECU.

The vehicular brake control device having the structure described above also includes a brake ECU 10 as shown in FIG. 2. The brake ECU 10 imports detection signals from each of the pressure sensors 11 and 12 and wheel speed sensors 13a to 13d. In addition, the brake ECU 10 outputs drive signals to each of the valves SMCF, SREC, STR, SREA, SFRH to SRLR, and the electric motor M based on various detection signals and control signals. Thus, the ECU 10 sometimes performs control so that the regulator pressure is maintained within a predetermined pressure range and sometimes controls the brake fluid pressures applied to the wheel cylinders Wfl to Wrr.

More specifically, the valves SMCF, SREC, STR, SREA, and SFRH to SRLR are set to the valve positions shown in FIG. 1 in the non-operational mode in which electric current is not supplied to their solenoids. On the other hand, the valves SMCF, SREC, STR, SREA, and SFRH to SRLR are set to the valve positions different from those shown in FIG. 1 in the operational mode in which electric current is supplied to their solenoids. The ECU 10 controls the valve positions of the valves SMCF, SREC, STR, SREA, and SFRH to SRLR by controlling electric current supply to their solenoids, so that the ECU 10 performs not only the normal braking operation but also various controls including an anti-skid control, a traction control, a vehicular stability control, and a vehicular start aid control. The vehicular start aid control is an embodiment of a brake force maintain control.

FIG. 3 is a table showing operating states of the various valves in the normal braking operation and the vehicular start aid control. Hereinafter, operation of the vehicular brake control device is described in the normal braking operation and the vehicular start aid control with reference to FIG. 3. Controls other than the vehicular start aid control is not described herein since they are not a characteristic part of the present invention.

[Normal Braking Operation]

In the normal braking operation, electric current supplies to the solenoid on-off valves SMCF, SREA, STR, and SREC are set to the OFF states in which electric current is not supplied to these valves. Furthermore in the normal braking operation, electric current supplies to the booster valves SFRH to SRLH and the pressure reducing valves SFRR to SRLR are also set to the OFF states in which electric current is not supplied to these valves. In other words, the solenoid on-off valve STR is closed, the solenoid on-off valve SREC is open, the solenoid on-off valve SMCF is open, and the solenoid on-off valve SREA is closed. In addition, the booster valves SFRH to SRLH are open, and the pressure reducing valves SFRR to SRLR are closed.

In this case, the brake fluid pressure stored in the accumulator ACC is not transmitted to the wheel cylinders Wfl to Wrr since the solenoid on-off valve STR is closed. In addition, the master cylinder pressure generated at the master cylinder MC is transmitted thorough the solenoid on-off valve SMCF to the wheel cylinders Wfr and Wfl. Furthermore, the brake fluid pressure generated at the regulator RG is transmitted through the solenoid on-off valve SREC to the wheel cylinders Wrr and Wrl.

[Vehicular Start Aid Control]

In the vehicular start aid control, electric current supplies to the solenoid on-off valves SMCF and SREC are set to the ON states in which electric current is supplied to these valves. Furthermore in the vehicular start aid control, electric current supplies to the other valves such as the solenoid on-off valves SREA and STR are also set to the OFF states in which electric current is not supplied to these valves. Thus, the solenoid on-off valves SMCF and SREC are closed and the brake fluid pressures applied to the wheel cylinders Wfl to Wrr are maintained.

Therefore, the brake force is maintained even after the driver stops pressing the brake pedal BP in order to return the brake pedal BP to a release position. The release position is a place at which the brake pedal BP is located when the pressing force applied by the driver to the brake pedal becomes zero. The brake force is continuously maintained while the vehicle is still (i.e. not moving) or parked, in other words, the brake force is maintained until the driver presses the accelerator pedal to start the vehicle. Therefore, it is possible to start the vehicle without letting the vehicle slide down even if the vehicle is still or parked on a slope.

Figure 4:
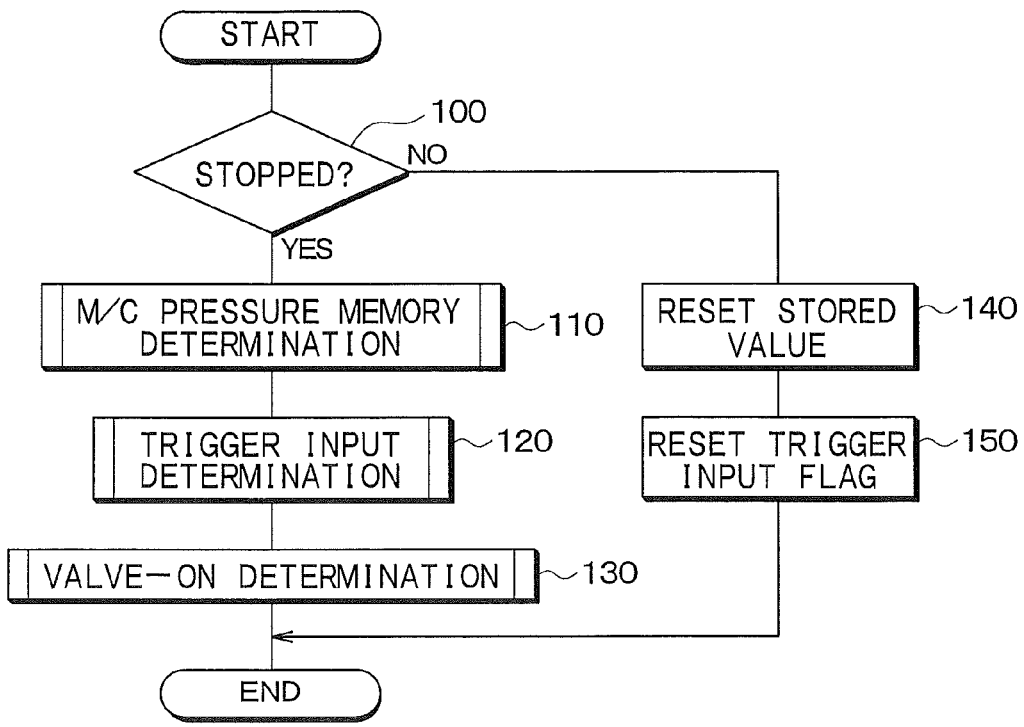
FIG. 4 is a flowchart showing an overview of a main control process including the vehicular start aid control.

Hereinafter, detailed description is given of the vehicular start aid control performed by the vehicular brake control device according to the present embodiment. FIG. 4 is a flowchart showing an overview of a main control process including the vehicular start aid control. The vehicular start aid control is described with reference to the FIG. 4.

After the ignition switch (not shown) of the vehicle is turn on, the brake ECU 10 performs the main control process at every predetermined control cycle.

The brake ECU 10 determines at step 100 whether the vehicle has stopped. This determination is executed by determining whether all of the wheel speeds obtained by the detection signals from the wheel speed sensors 13a to 13d has become zero, or by determining whether an estimate of the speed of the vehicular body has become zero, wherein the estimate is calculated by the obtained wheel speeds through a well-known method. If the determination at step 100 is affirmative, the brake ECU 10 proceeds to step 110.

Figure 5:
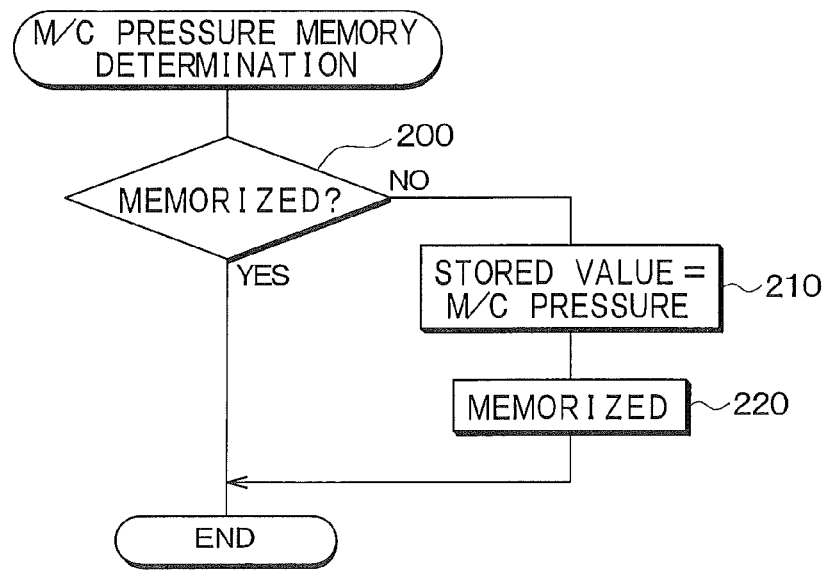
FIG. 5 is a flowchart showing details of a master cylinder pressure memory determination process.

At step 110, the brake ECU 10 executes a master cylinder pressure memory determination process. FIG. 5 is a flowchart showing details of the master cylinder pressure memory determination process. Hereinafter, the master cylinder pressure memory determination process is described with reference to FIG. 5.

In the master cylinder pressure memory determination process, the brake ECU 10 determines at step 200 whether the master cylinder pressure has already been memorized. The determination becomes affirmative if a memorizing flag has been set and becomes negative if the memorizing flag has been reset. The memorizing flag is a flag which indicates, if the memorizing flag is set, that the master cylinder pressure is memorized at step 220 described later.

If the determination at step 200 becomes negative, the brake ECU 10 proceeds to step 210 and memorizes the master cylinder pressure at the present control cycle as a stored value, wherein the master cylinder pressure is obtained from the detection signal of the pressure sensor 12 at the present control cycle. It should be noted that the brake ECU 10 obtains the master cylinder pressure once per a control cycle based on the detection signal of the pressure sensor 12. Then the brake ECU 10 proceeds to step 220 to set the memorizing flag indicating that the master cylinder pressure has been memorized. Then the brake ECU ends the vehicular start aid control at the present control cycle. In contrast, if the determination at step 200 becomes affirmative, the brake ECU 10 just ends the vehicular start aid control at the present control cycle. Thus, the vehicular start aid control at the present control cycle is ended.

Figure 6:
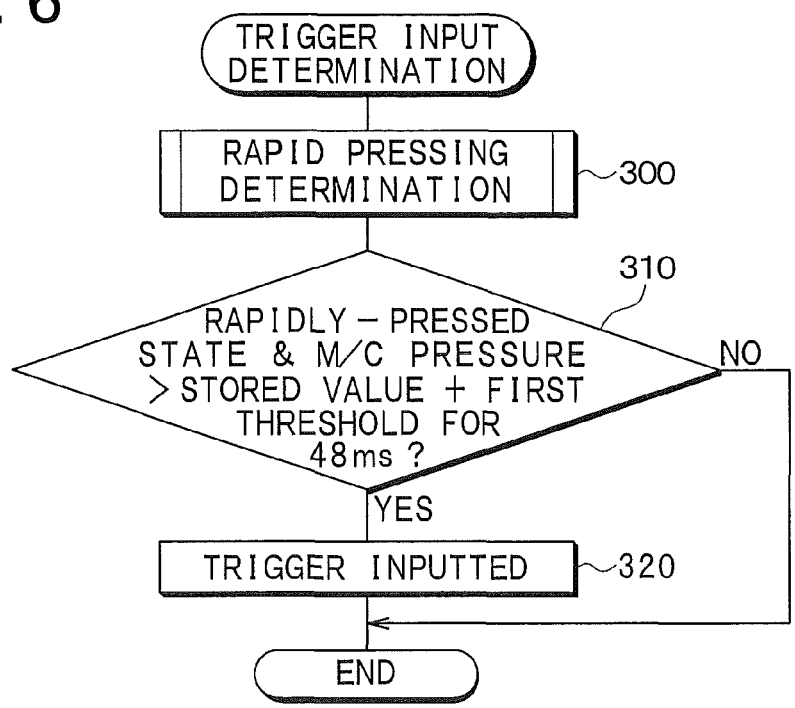
FIG. 6 is a flowchart showing details of a trigger input determination process.

Next, the brake ECU 10 proceeds to step 120 in FIG. 4 to execute a trigger input determination process. FIG. 6 is a flowchart showing details of the trigger input determination process. Hereinafter, the trigger input determination process is described with reference to FIG. 6.

Figure 7:
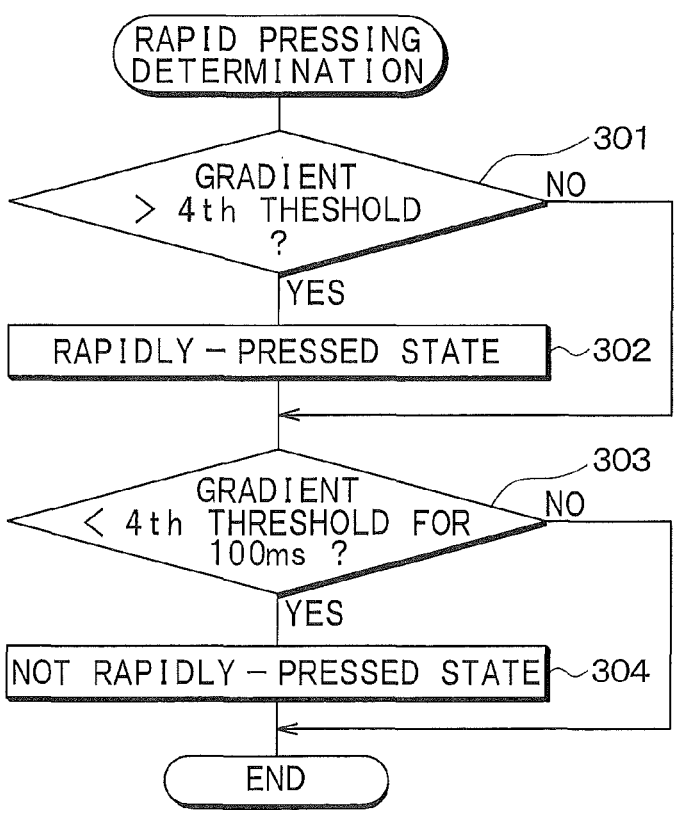
FIG. 7 is a flowchart showing details of a rapid pressing determination process.

In the trigger input determination process, the brake ECU 10 executes at step 300 a rapid pressing determination process for making a rapidly-pressed determination as to whether the vehicle (more specifically, the brake pedal BP) is in a rapidly-pressed state. The rapidly-pressed state is a state in which the brake pedal BP has been further pressed rapidly, more specifically, the brake pedal BP was further pressed rapidly while the vehicle was not moving. It is not necessary for the brake pedal BP to be pressed now. In more detail, FIG. 7 is a flowchart showing details of the rapid pressing determination process. As shown in FIG. 7, the brake ECU 10 starts the rapid pressing determination process by determining at step 301 whether a gradient (i.e. an increase rate) of the master cylinder pressure is larger than a fourth threshold.

The fourth threshold is a reference value for checking whether the brake pedal BP is being further pressed rapidly. The gradient of the master cylinder pressure becomes larger as the rapidness of the further pressing of the brake pedal BP becomes larger, since the master cylinder pressure changes in accordance with how far the brake pedal is pressed. Taking advantage of this fact, the brake ECU 10 determines that the vehicle is in the rapidly-pressed state at step 302 when the gradient of the master cylinder pressure becomes larger than the fourth threshold. The difference between a present master cylinder pressure and a previous master cylinder pressure can be used as the gradient of the master cylinder pressure, wherein the present master cylinder pressure is the master cylinder pressure obtained by the detection signal from the pressure sensor 12 at the present control cycle and the previous master cylinder pressure is the master cylinder pressure obtained by the detection signal from the pressure sensor 12 at the previous control cycle.

As described above, if the determination at step 301 is affirmative, the brake ECU 10 proceeds to step 302 to set a rapidly-pressed flag for indicating that the vehicle is in the rapidly-pressed state, and then proceeds to step 303. By executing the process at step 302, the rapidly-pressed determination becomes affirmative. If the determination at step 301 is negative, the brake ECU 10 just proceeds to step 303.

At step 303, the brake ECU 10 determines whether the gradient of the master cylinder pressure has been smaller than the fourth threshold for continuous first predetermined time (e.g. 100 ms).

Hereinafter, the meaning of the step 303 is described. At step 302, the brake EUC 10 determines that the vehicle is in the rapidly-pressed state by setting the rapidly-pressed flag. Therefore, the rapidly-pressed flag indicates that the vehicle is in the rapidly-pressed state. The rapidly-pressed flag is used at a determination process at step 310 described later. In view of the relation between the rapidly-pressed flag and other conditions for the determination at step 310, the rapidly-pressed flag should not be reset so quickly once it is set.

Accordingly, the brake ECU 10 does not reset the rapidly-pressed flag for at least the first predetermined time after setting the rapidly-pressed flag at step 302. In other words, once the rapidly-pressed determination changes from negative to affirmative, the rapidly-pressed determination is kept affirmative for at least the first predetermined time.

More specifically, the brake ECU 10 does not reset the rapidly-pressed flag until the gradient of the master cylinder pressure keeps being smaller than the fourth threshold for the first predetermined time and resets the rapidly-pressed flag when the gradient of the master cylinder pressure has been smaller than the fourth threshold for the first predetermined time. In order to execute this operation, the brake ECU 10 proceeds to step 304 to determine that the vehicle is not in the rapidly-pressed state anymore and resets the rapidly-pressed flag when the determination at step 303 becomes affirmative. By executing the process at step 304, the rapidly-pressed determination becomes negative. When the determination at step 303 becomes negative, the brake ECU just ends the rapid pressing determination process.

It should be noted that the first predetermined time is related with a second predetermined time which is used at step 310 described later. More specifically, the first predetermined time is longer than the second predetermined time. The brake ECU 10 may, for example, count elapsed time and determine whether the counted time reaches 100 ms in order to determine whether the first predetermined time has passed or not.

Then, the brake ECU 10 proceeds to step 310 in FIG. 6 to determine whether both of first and second conditions are satisfied, wherein the first condition is that the rapidly-pressed flag has not been reset yet and the second condition is that the master cylinder pressure obtained by the detection signal from the pressure sensor 12 at the present control cycle has continuously been larger than the sum of a first threshold and the stored value for the master cylinder pressure.

The first threshold can be used as a reference value for checking whether the driver has an intention of executing the vehicular start aid control. This is because an intention of executing the vehicular start aid control is checked based on whether the driver further presses the brake pedal BP after the vehicle stops. Therefore, the brake ECU 10 memorizes the master cylinder pressure as the stored value when the vehicle stops moving and then determines that the driver has pressed the brake pedal BP in order to execute the vehicular start aid control when the master cylinder pressure is larger than the sum of the stored value and the first threshold after the vehicle stops.

The second predetermined time is adjusted to prevent the brake ECU from needlessly allowing the vehicular start aid control to start when some noise increases the master cylinder pressure. Therefore, the second predetermined time is set to be longer than duration of a noise pulse likely to occur. In addition, the second predetermined time is set to be shorter than the first predetermined time. This is because that the rapidly-pressed state needs to be maintained for at least the second predetermined time in order to make possible an affirmative determination at step 310. Thus, the second predetermined time is set in order to remove negative influence of noise, and the first predetermined time is set to be larger than the second predetermined time.

The determination at step 310 becomes affirmative and the brake ECU 10 proceeds to step 320 when both of the first and the second conditions are satisfied, wherein the first condition is that the vehicle is in the rapidly-pressed state and the second condition is that the master cylinder pressure has continuously been larger than the sum of the first threshold and the stored value for the master cylinder pressure. At step 320, the brake ECU 10 sets a trigger input flag and ends the trigger input determination process at the present control cycle. The trigger input flag is a flag indicating that a trigger for allowing the vehicular start aid control to start is inputted. If the determination at step 310 is negative, the brake ECU 10 just ends the trigger input determination process at the present control cycle. Thus, the trigger input determination process in the present control cycle is completed.

Figure 8:
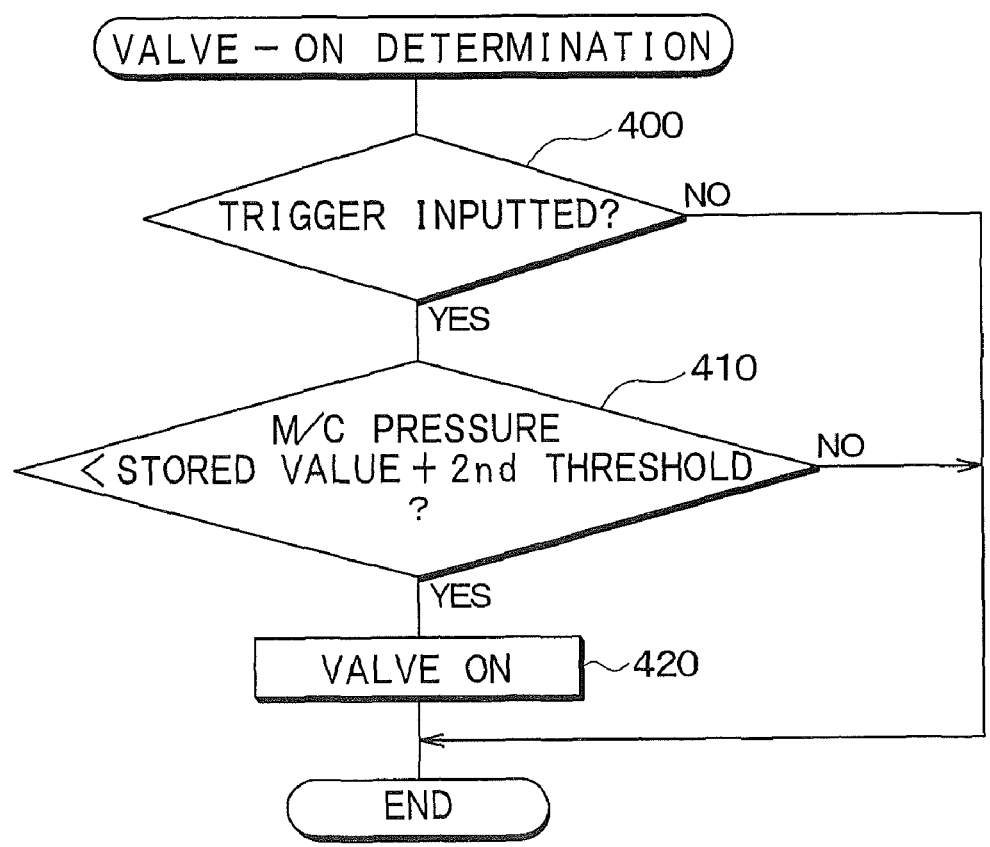
FIG. 8 is a flowchart showing details of a valve-on determination process.

Then the brake ECU proceeds to step 130 in FIG. 4 to execute a valve-on determination process. FIG. 8 is a flowchart showing details of the valve-on determination process. Hereinafter, the valve-on determination process is described with reference to FIG. 8.

In the valve-on determination process, the brake ECU 10 determines at step 400 whether the trigger is inputted. The determination is made based on whether the trigger input flag has been set at step 320 in FIG. 6. When the trigger is inputted, the brake ECU 10 proceeds to step 410 to determine whether the master cylinder pressure obtained by the detection signal from the pressure sensor 12 at the present control cycle is smaller than the sum of a second threshold and the stored value for the master cylinder pressure which is stored at step 210 in FIG. 5.

The second threshold is a reference value for checking whether the pressing force applied to the brake pedal BP is reduced after detecting the driver's intention to start the vehicular start aid control, in other words, for checking whether the brake pedal BP is returning to the release position after detecting the driver's intention to start the vehicular start aid control. While the brake pedal is being further pressed down after the trigger is inputted, the master cylinder pressure increases further beyond the sum of the stored value and the first threshold. In contrast, the master cylinder pressure decreases gradually and eventually becomes smaller than sum of the stored value and the first threshold while the brake pedal BP is returning to the release position. Therefore, the second threshold is set to be smaller than the first threshold so as to determine, after the trigger is inputted, surely whether the brake pedal BP is still being further pressed down or the brake pedal BP is returning to the release position.

When the determination at step 410 becomes affirmative, the brake ECU 10 proceeds to step 420 to place an instruction for turning valves on and then ends the valve-on determination process at the present control cycle. Thus, the valves listed in FIG. 3 come into the states in the vehicular start aid control as shown in FIG. 3. Therefore, the solenoid on-off valve SMCF and the solenoid on-off valve SREC are supplied with electric current and the vehicle accordingly starts maintaining the brake force. As a result, it is possible to achieve the vehicular start aid control in which the vehicle starts running without sliding down on a slope even if the vehicle is still or parked on the slope. If the determination at step 400 or 410 becomes negative, the brake ECU ends the valve-on determination process at the present control cycle.

When the determination at step 100 is negative, the vehicular start aid control is not necessary from the beginning or is no longer necessary. Therefore in this case, the brake ECU 10 proceeds to step 140 to reset the stored value for the master cylinder pressure and the memorizing flag. Then the brake ECU 10 proceeds to step 150 to reset the trigger input flag and ends the present control cycle. Thus, the main control process in the present control cycle is completed.

Figure 9:
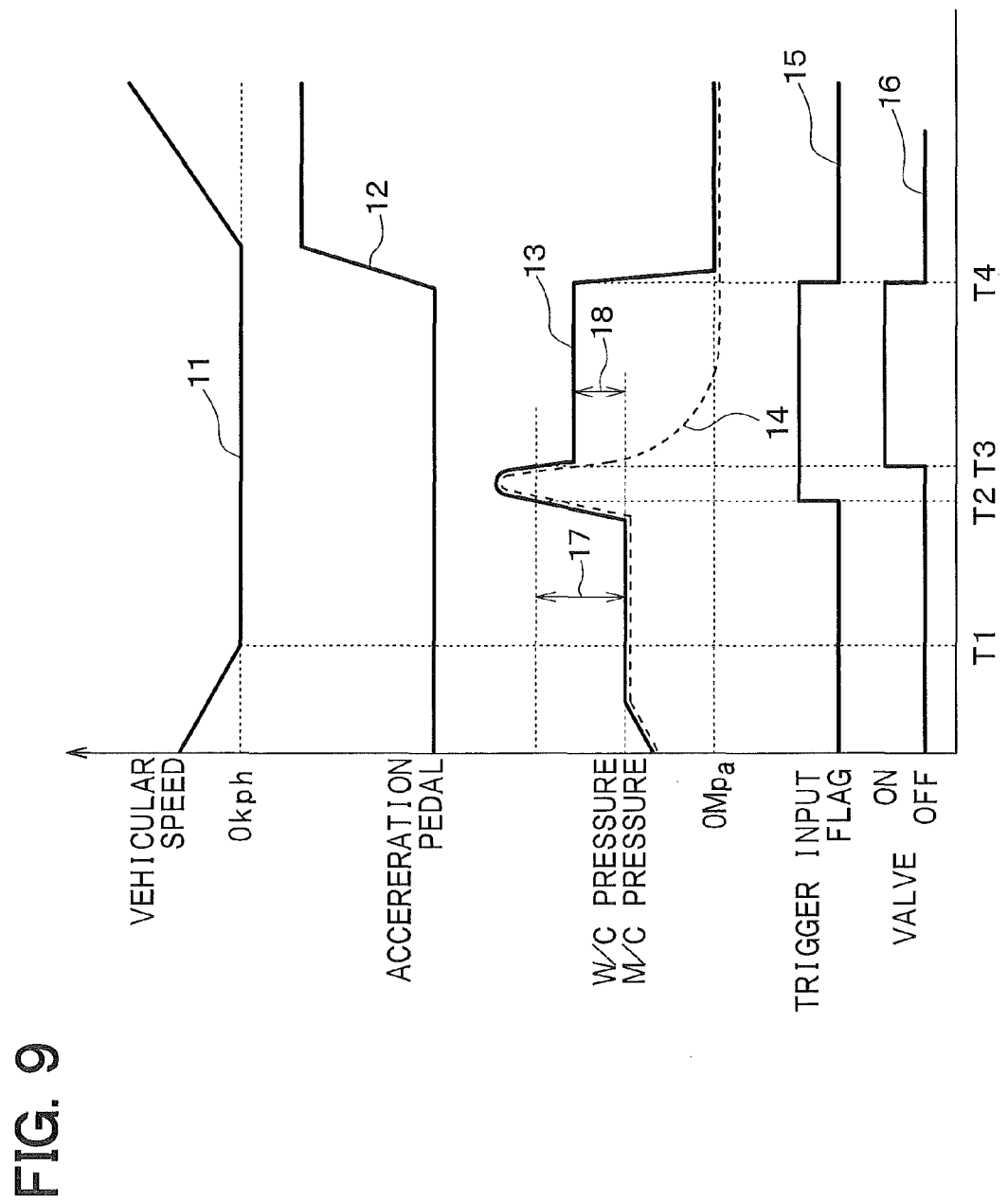
FIG. 9 is a timing chart showing behaviors of various quantities during the vehicular start aid control.

FIG. 9 is a timing chart showing behaviors of various quantities 11 to 16 during the vehicular start aid control. First, the master cylinder pressure 14 is generated based on the pressing force applied to the brake pedal BP and the brake fluid pressures 13 are accordingly transmitted to the wheel cylinders Wfl to Wrr. Then the brake force is generated at the wheels FL to RR and the speed 11 of the vehicle starts decreasing. Next, when it is detected that the speed 11 of the vehicle becomes 0 km/h and the vehicle stops at time T1, the master cylinder pressure 14 at this time is memorized as the stored value. After that, the driver further presses the brake pedal BP in order to execute the vehicular start aid control. When the continuous time in which the gradient of the master cylinder pressure 14 is larger than the fourth threshold reaches the first predetermined time, the brake ECU 10 determines that the vehicle is in the rapidly-pressed state. After that, when the continuous time in which the master cylinder pressure 14 is larger than the sum of the stored value and the first threshold 17 becomes longer than the second predetermined time at time T2, the trigger input flag is set. It should be noted that further pressing of the brake pedal BP is a condition for solely allowing the vehicular start aid control to start and is merely a part of the condition for actually starting the vehicular start aid control.

After that, when the master cylinder pressure becomes smaller than the sum of the stored value and the second threshold at time T3, valves SMCF and SREC are tuned on as shown in FIG. 3. After that, when the acceleration pedal is pressed down and the vehicle starts running at time T4, the trigger input flag is reset, the valves SMCF and SREC are tuned off, and accordingly the maintained brake force is released.

Figure 10:
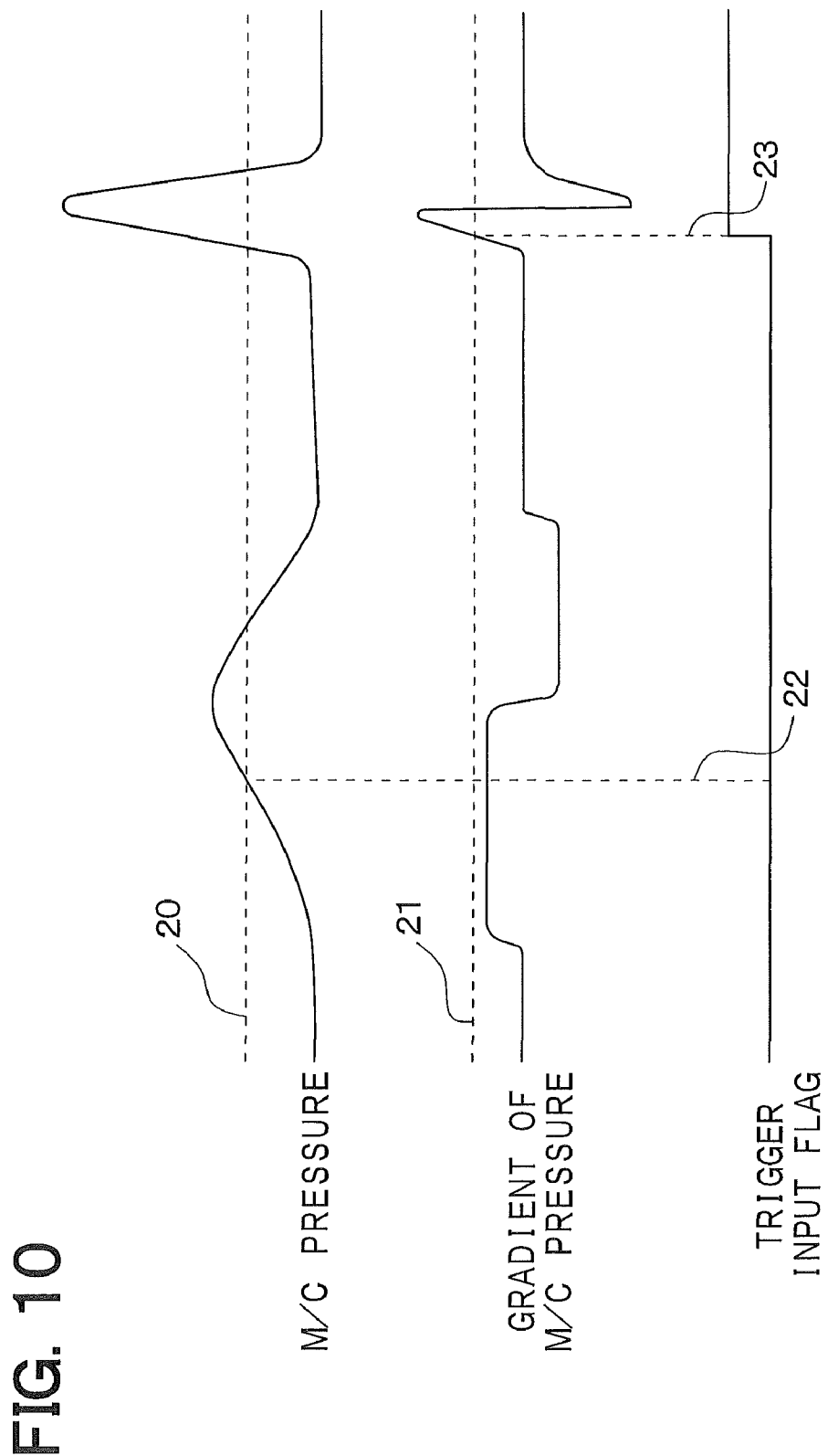
FIG. 10 is a timing chart showing the way how a driver presses down a brake pedal, a gradient of a master cylinder pressure, and a trigger input flag.

FIG. 10 is a timing chart showing the way how the driver presses down the brake pedal BP, the gradient of the master cylinder pressure, and the trigger input flag. In the case that the brake pedal BP is pressed down although the driver does not have an intention of executing the vehicular start aid control, the brake pedal BP is pressed down gently. Therefore in this case, the master cylinder pressure changes slowly and the gradient of the master cylinder pressure remains small, as shown at time 22 in FIG. 10. Accordingly, the gradient of the master cylinder pressure does not exceed the fourth threshold 21. Therefore, the brake ECU 10 does not determine that the vehicle is in the rapidly-pressed state or set the trigger input flag.

In contrast, when the driver presses down the brake pedal quickly, the gradient of the master cylinder pressure becomes larger as shown at time 23 in FIG. 10. In this case, the gradient of the master cylinder pressure exceeds the fourth threshold 21 and the brake ECU 10 determines that the vehicle is in the rapidly-pressed state. After that, the trigger input flag is set when the continuous time in which the master cylinder pressure is larger than the sum 20 of the stored value and the first threshold becomes longer than the second predetermined time.

As described above, based on in what way the brake pedal is pressed down, the brake ECU 10 according to the present embodiment sets the trigger input flag and allows the vehicular start aid control to start. Therefore, it is possible to prevent the vehicular start aid control is executed even though the driver does not have an intention of executing it.

As described above, the brake ECU 10 according to the present embodiment makes a rapidly-pressed determination as to whether the vehicle is in the rapidly-pressed state in which the brake pedal BP has been further pressed rapidly. When the vehicle is in the rapidly-pressed state, the brake ECU makes a determination to allow the vehicular start aid control to start if a condition for allowing the vehicular start aid control to start is satisfied. Therefore, it is possible to prevent the vehicular start aid control from being needlessly executed even though the driver does not have an intention of executing it.

In addition, the brake ECU 10 according to the present embodiment divides conditions for executing vehicular start aid control into two parts. More specifically, the brake ECU 10 allows the vehicular start aid control to start in the case that the brake pedal BP is pressed further than it is pressed when the vehicle stops, and after that, the brake ECU 10 actually executes the vehicular start aid control in the case that the pressing force on the brake pedal BP is reduced.

Thus, the vehicular start aid control is not executed until the pressing force on the brake pedal BP is reduced, and the vehicular start aid control is executed when the pressing force on the brake pedal BP is reduced. Therefore, the brake pedal BP is not further pressed after the solenoid on-off valves SMCF and SREC are closed in the vehicular start aid control. Therefore, it is possible to prevent the driver from feeling as if he/she is pressing a rigid board when he/she further presses the brake pedal BP. In other words, it is possible to prevent the driver from feeling as if he/she is pressing a rigid board and to give a better brake feeling to the driver in executing the vehicular start aid control for maintaining, after the vehicle stops, the brake force generated by the operation of the brake pedal BP.

Second Embodiment

Hereinafter, a second embodiment of the present invention is described. The present embodiment is different from the first embodiment in the valve-on determination process. The other parts of the present embodiment is the same as the first embodiment. Therefore, the difference between the present embodiment and the first embodiment is mainly described.

In the vehicular brake control device according to the first embodiment, the solenoid on-off valves SMCF and SREC are two-position valves which switch between the open state and the closed state. Thus, each of the two-position valves may allow brake fluid to flow in both directions, namely, to flow from one side of the valve to the other side and from said the other side to said one side.

However, each of the two-position valves may allow brake fluid to flow only in one direction. More specifically, each of the two-position valves may include a check valve and a spring wherein the spring biases the valve body of the check valve to the seat of the check valve. In this case, the solenoid on-off valve SMCF may be constructed so that it allows the brake fluid to flow from the master cylinder MC to the wheel cylinders Wfl and Wfr but prevents the brake fluid from flowing in the reverse direction, namely, from the wheel cylinders Wfl and Wfr to the master cylinder MC. In addition, the solenoid on-off valve SREC may be constructed so that it allows the brake fluid to flow from the wheel cylinders Wrl and Wrr to the regulator RG but prevents the brake fluid from flowing in the reverse direction, namely, from the regulator RG to the wheel cylinders Wrl and Wrr.

As described in the first embodiment, reduction of the pressing force on the brake pedal BP is detected based on the master cylinder pressure. In this operation, the master cylinder pressure is used as an estimate for the wheel cylinder pressures. This operation is based on the assumption that the master cylinder pressure corresponds to the wheel cylinder pressures. The brake ECU 10 determines that the wheel cylinder pressures have become a desired value when the master cylinder pressure has become a desired value. The brake ECU 10 then starts executing the vehicular start aid control to maintain the brake force.

Thus, the brake ECU 10 executes the vehicular start aid control on detecting reduction of the pressing force applied to the brake pedal BP based on the master cylinder pressure. However, the wheel cylinder pressures may change far more slowly than the master cylinder pressure if the reduction rate of the pressing force on the brake pedal BP is large enough. In this case, the actual wheel cylinder pressures may remain higher than the desired wheel cylinder pressure although the brake ECU 10 executes the vehicular start aid control assuming that the wheel cylinder pressures have become the desired wheel cylinder pressure. In other words, a containment phenomenon may occur in which excessive wheel cylinder pressure are remained in the wheel cylinders. Especially in a low temperature situation, viscous resistance of the brake fluid is large and it is therefore highly possible that the wheel cylinder pressures change far more slowly than the master cylinder pressure.

In the present embodiment, as a measure against the containment phenomenon, the brake ECU 10 causes the detection signal of the pressure sensor 12 to pass through a first filter, wherein the detection signal of the pressure sensor 12 serves as raw data indicating the master cylinder pressure.

The first filter is designed so that the filtered master cylinder pressure which has passed through the first filter changes gently with slower response to the original master cylinder pressure as the raw data and that the filtered master cylinder pressure changes in accordance with the change of the wheel cylinder pressures. Then the brake ECU 10 determines whether to start the vehicular start aid control based on the filtered master cylinder pressure which has passed through the first filter. More specifically, the first filter may be a low-pass filter having a first cutoff frequency (e.g. 9 Hz). The brake ECU 10 calculates a first estimate of the wheel cylinder pressures by causing the detection signal from the pressure sensor 12 to pass the first filter. The first cutoff frequency is set so that the filtered master cylinder changes relative to original master cylinder pressure in a similar manner to the wheel cylinder pressures when the viscous resistance of the brake fluid is large. The viscous resistance of the brake fluid becomes large in, for example, a low temperature situation. Thus, it is possible to calculate a good estimate of the wheel cylinder pressures in the case that the viscous resistance of the brake fluid is large.

As described above, the first estimate for the wheel cylinder pressures is a value intended for the case that the brake fluid is large because of, for example, low temperature. If the first estimate for the wheel cylinder pressures which decreases slowly were always used, it would be used even when the wheel cylinder pressures change in quick response to the master cylinder pressure because of normal temperature. In this case, the first estimate for the wheel cylinder pressures becomes larger than the actual wheel cylinder pressures because the viscous resistance of the brake fluid is not large. Therefore, if the brake ECU determines whether to start the vehicular start aid control based only on the first estimate for the wheel cylinder pressure, the actual wheel cylinder pressure becomes smaller than the desired wheel cylinder pressures at the time of onset of the vehicular start aid control. As a result, the vehicle cannot generate a sufficient brake force and may slide down on a slope.

Therefore, the brake ECU 10 calculates a second estimate for the wheel cylinder pressure, wherein the second estimate decreases more slowly than the original master cylinder pressure and also decreases more quickly (i.e. in more quick response to the original master cylinder pressure) than the first estimate for the wheel cylinder pressures. More specifically, the brake ECU 10 uses a second filter which is a low-pass filter having a second cutoff frequency (e.g. 15 Hz) larger than the first cutoff frequency. The brake ECU 10 then calculates the second estimate for the wheel cylinder pressure by passing the detection signal (i.e. the original master cylinder pressure serving as the raw data) from the pressure sensor 12 through the second filter. The second cutoff frequency is set so that the vehicle does not slide down even if the viscous resistance of the brake fluid becomes smallest in the environment in which the vehicular brake control device is used.

Figure 11:
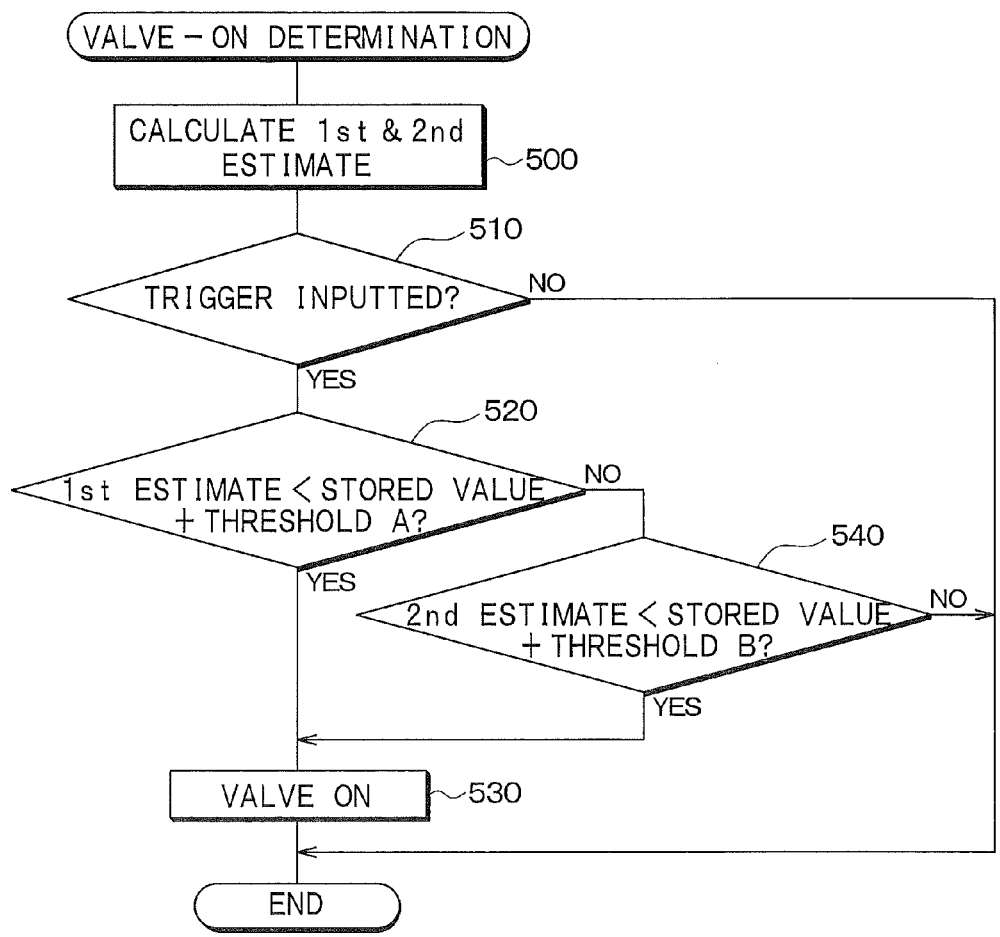
FIG. 11 is a flowchart showing a valve-on determination process in a second embodiment of the present invention.

Based on the above concept, the brake ECU in the present embodiment executes the valve-on determination process as follows. FIG. 11 is a flowchart showing the valve-on determination process in the present embodiment.

As shown in FIG. 11, at step 500, the brake ECU 10 imports the detection signal (i.e. the original master cylinder pressure) from the pressure sensor 12 and passes it through the first filter and the second filter individually to calculate the first estimate and the second estimate for the wheel cylinder pressures. Then at step 510, the brake ECU 10 determines whether the trigger is inputted in the same manner as step 400 in FIG. 8. When the determination at step 510 becomes affirmative, the brake ECU 10 proceeds to step 520.

At step 520, the brake ECU 10 determines whether the first estimate for the wheel cylinder pressures becomes smaller than the sum of the stored value and a threshold A (anti-containment threshold). The threshold A takes the place of the second threshold in the first embodiment and is for preventing the containment phenomenon in which an excessive wheel cylinder pressure is generated because of large viscous resistance of the brake fluid. The threshold A is therefore smaller than the first threshold. With the process in step 520, even in the situation that the large viscous resistance of the brake fluid causes the wheel cylinder pressures to decrease more slowly than the master cylinder pressure, the brake ECU 10 can estimate the slowly changing wheel cylinder pressures and determine whether the estimated pressure (i.e. the first estimate) becomes the desired wheel cylinder pressure. If the determination at step 520 is affirmative, the brake ECU 10 proceeds to step 530 to place an instruction for turning valves on as is done at step 420 in FIG. 8. After step 530, the brake ECU 10 ends the valve-on determination process in the present control cycle. If the determination at step 520 is negative, the brake ECU 10 proceeds to step 540.

At step 540, the brake ECU 10 determines whether the second estimate for the wheel cylinder pressures has become smaller than the sum of the stored value and a threshold B (anti-sliding threshold). The threshold B also takes the place of the second threshold in the first embodiment and is for preventing a slide-down phenomenon in which small viscous resistance of the brake fluid causes insufficient wheel cylinder pressures which allow the vehicle to slip down. With the process in step 540, even in the situation that the small viscous resistance of the brake fluid causes the wheel cylinder pressures to decrease in quick response to the master cylinder pressure, the brake ECU can estimate the quickly changing wheel cylinder pressures and determine whether the estimated pressure (i.e. the second estimate) becomes the desired wheel cylinder pressure If the determination at step 540 is affirmative, the brake ECU 10 proceeds to step 530 to place an instruction for turning valves on as is done at step 420 in FIG. 8. After step 530, the brake ECU 10 ends the valve-on determination process in the present control cycle. If the determination at step 540 is negative, the brake ECU 10 ends the valve-on determination process in the present control cycle.

Figure 12A:
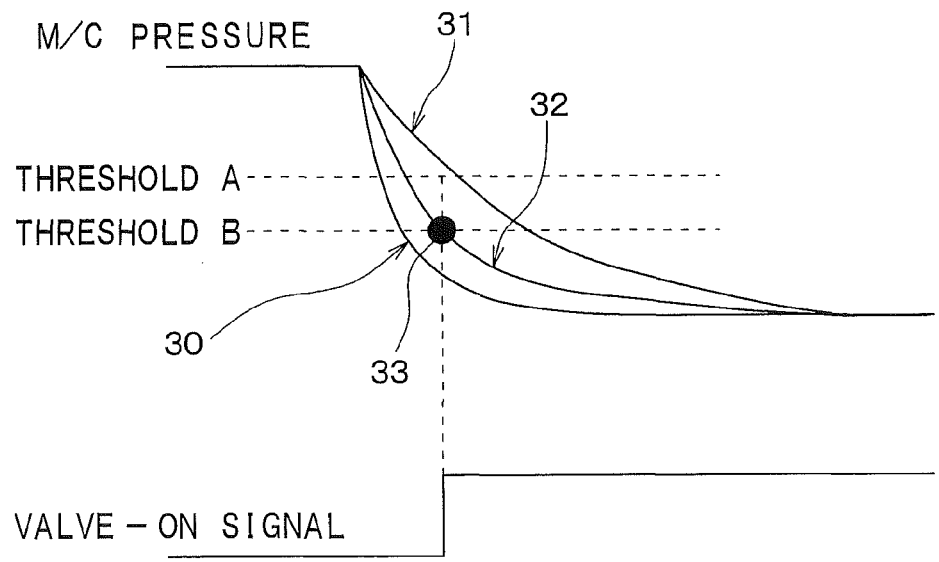
FIG. 12A is a timing chart in the situation that the brake pedal is returning to a release position quickly.
Figure 12B:
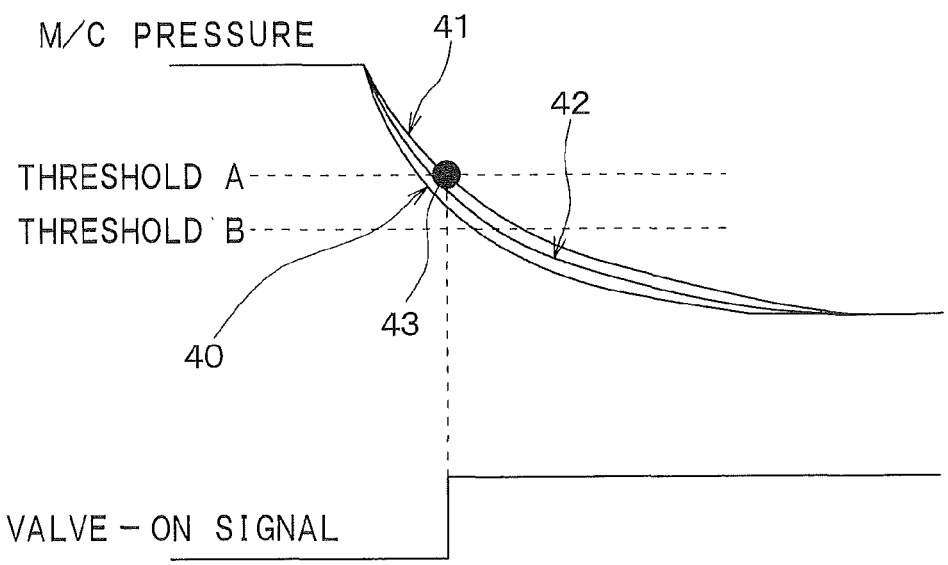
FIG. 12B is a timing chart in the situation that the brake pedal is returning to the release position slowly.

FIGS. 12A and 12B are timing charts showing changes of the original master cylinder pressure (the raw data), the first estimate for the wheel cylinder pressures which is obtained by using the first filter, and the second estimate for the wheel cylinder pressures which is obtained by using the second filter. FIG. 12A is a chart in the situation that the brake pedal is returning toward the release position quickly and FIG. 12B is a chart in the situation that the brake pedal is returning toward the release position slowly.

As shown in FIG. 12A, the first estimate 31 and the second estimate 32 are fairly different from the original the master cylinder pressure 30 in the decrease rate when the brake pedal is quickly returning to the release position.

In this case, the brake ECU 10 can prevent the exceedingly high wheel cylinder pressures even in the high viscous resistance of the brake fluid since the brake ECU 10 turns the valves SMCF and SREC on when a condition is satisfied that the first estimate 31 becomes smaller than the sum of the stored value and a threshold A. However, it is concerned that the vehicle slips down on a slope because it takes a long time until this condition come to be satisfied. In this case, the second estimate 32 can get smaller than the sum of the stored value and the threshold B at time 33 earlier than the first estimate 31 gets smaller than the sum of the stored value and the threshold A, wherein the threshold B is set to be smaller than the threshold A. When this occurs, it is possible to prevent the vehicle from sliding down a slope.

On the other hand, as shown in FIG. 12B, the first estimate 41 and the second estimate 42 are slightly different from the original master cylinder pressure 40 in the decrease rate when the brake pedal is slowly returning to the release position. Therefore, there is little concern of sliding down of the vehicle even if the brake ECU 10 turns the valves on when the first estimate 41 becomes smaller than the sum of the stored value and the threshold A at time 43. Therefore in this case, priority is given to preventing the exceedingly high wheel cylinder pressures when the viscous resistance of the brake fluid is high.

Thus, it is possible to prevent the actual wheel cylinder pressures from becoming larger than the desired wheel cylinder pressure because the brake ECU 10 determines whether to start the vehicular start aid control based on the first estimate which is obtained by passing the detection signal from the pressure sensor 12 through the first filter. In other words, it is possible to prevent the containment phenomenon in which an excessive wheel cylinder pressures are remained.

In addition, it is possible to generate the wheel cylinder pressures surely sufficient for preventing the vehicle from sliding down on a slope because the brake ECU 10 determines whether to start the vehicular start aid control based on the second estimate which is obtained by passing the detection signal from the pressure sensor 12 through the second filter.

As a result, it is possible to generate the wheel cylinder pressure so as to prevent the containment phenomenon in which an excessive wheel cylinder pressures are remained and so as to generate the wheel cylinder pressure at least sufficient for preventing the vehicle from sliding down on a slope.

Third Embodiment

Hereinafter, the third embodiment of the present invention is described. The present embodiment is different from the first embodiment in the master cylinder pressure memory determination process. The other parts of the present embodiment are the same as the first embodiment. Therefore, the difference between the present embodiment and the first embodiment is mainly described.

In the first and second embodiments, the master cylinder pressure at the time when the vehicle stops is stored as the stored value, and the brake ECU 10 performs, based on the stored value, the determination as to whether to allow to start the vehicular start aid control and whether to actually start the vehicular start aid control. However, there may be an occasion in which the driver presses the brake pedal BP with an exceedingly strong pressure in order to stop the vehicle. In this case, the exceedingly strong pressure causes a very large master cylinder pressure when the vehicle stops. In this occasion, it may be difficult to press the brake pedal further in order to satisfy a condition for allowing the vehicular start aid control to start. Therefore, the stored value may be updated when the master cylinder pressure decreases after the vehicle stops.

However, if the stored value were updated without any restriction, there would be concern that the vehicle cannot generate a sufficient brake force in the vehicular start aid control. This is because the determinations for allowing and starting the vehicular start aid control are executed based on the updated stored value and the wheel cylinder pressures therefore become small when the vehicular start aid control is executed.

This concern is described more specifically. Basically, the stored value is updated only after the determination at step 100 in FIG. 4 becomes affirmative. Therefore in the vehicular start aid control, the wheel cylinder pressures have, in most cases, values which can keep the vehicle standing still (i.e. not moving) or parked. However, the vehicle does not start running just when the master cylinder pressure decreases to a critical value below which the brake force cannot keep the vehicle standing still or parked anymore. The vehicle starts just when a short time has passed after the master cylinder pressure decreases to the critical value. Therefore, if the brake ECU 10 updates the stored value to the master cylinder pressure right before the vehicle starts running, the stored value may become insufficient for the master cylinder for keeping the vehicle standing still or parked. In view of this, the brake ECU 10 in the present embodiment updates the stored value while generating the wheel cylinder pressures which are sufficient for surely keeping the vehicle standing still or parked.

Figure 13:
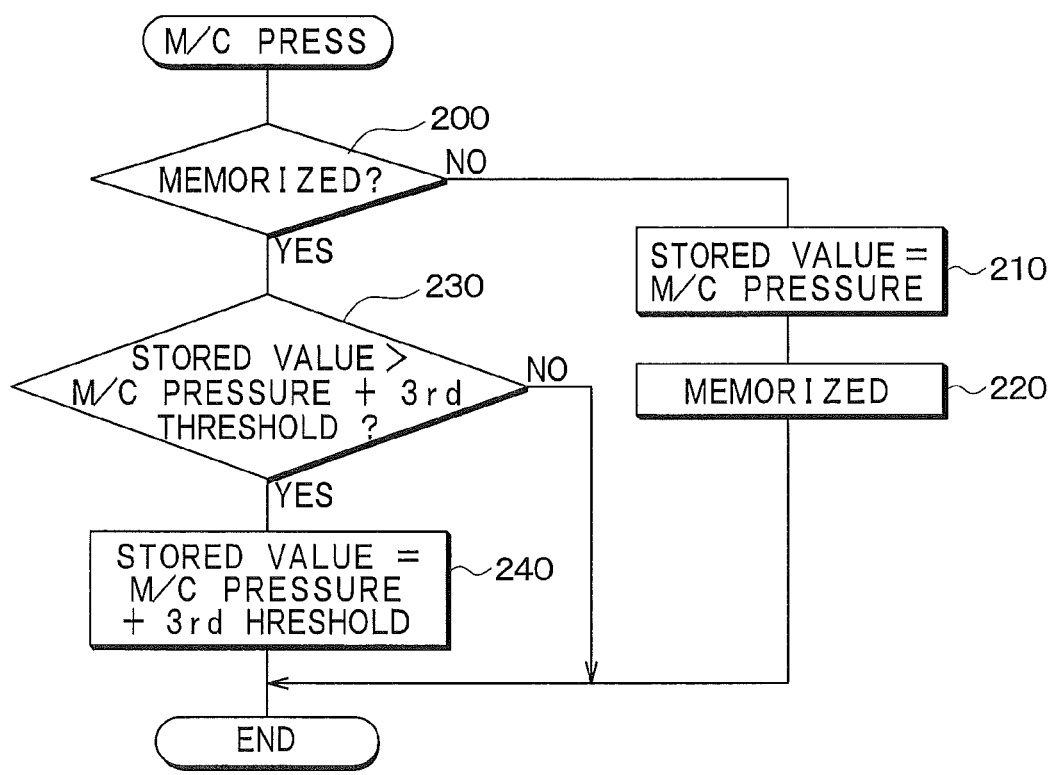
FIG. 13 is a flowchart showing details of a master cylinder pressure memory determination process in a third embodiment of the present invention.

More specifically, the valve-on determination process is executed as follows. FIG. 13 is a flowchart showing details of the master cylinder pressure memory determination process in the present embodiment.

In executing the master cylinder pressure memory determination process, the brake ECU executes at steps 200 to 220 the same processes as those in FIG. 5 in the first embodiment. Further in the present embodiment, the brake ECU 10 proceeds to step 230 when the determination at step 200 becomes affirmative because of the existing stored value. At step 230, the brake ECU 10 determines whether the stored value is larger than the sum of the current master cylinder pressure and a third threshold, wherein the current master cylinder pressure is obtained by the detection signal from the pressure sensor 12 at the present control cycle. The brake ECU 10 proceeds to step 240 to update the stored value so that the stored value becomes equal to the sum only when the determination at step 230 becomes affirmative.

The third threshold is determined to be equal to or larger than a supplemental pressure which should be added to the master cylinder pressure in order to keep the vehicle standing still or parked when the vehicle has not start running yet but a short time has passed after the master cylinder pressure becomes smaller than the critical value below which the brake force cannot keep the vehicle standing still or parked anymore.

Thus, the stored value always corresponds to the wheel cylinder pressure sufficient for keeping the vehicle standing still or parked because the stored value is not updated to a value which is smaller or equal to the sum of the third threshold and the master cylinder pressure which is generated currently.

In the case that the stored value is updated to the sum of the currently generated master cylinder and the third threshold, the sum of the stored value and the first threshold (i.e. the sum of the currently generated master cylinder, the third threshold, and the first threshold) is used in determining whether to allow execution of the vehicular start aid control. Therefore, the vehicular start aid control is not allowed to start until the driver further applies a supplemental pressing force to the brake pedal BP, wherein the supplemental pressing force corresponds to the sum of the third threshold and the first threshold. Therefore, the driver has to apply relatively large pressing force on the brake pedal BP. However, it is expected that the driver tends to press the brake pedal BP with a relatively large force at this time because the master cylinder pressure has already decreased at this time. Therefore, the vehicular start aid control can be properly allowed to start.

Figure 14:
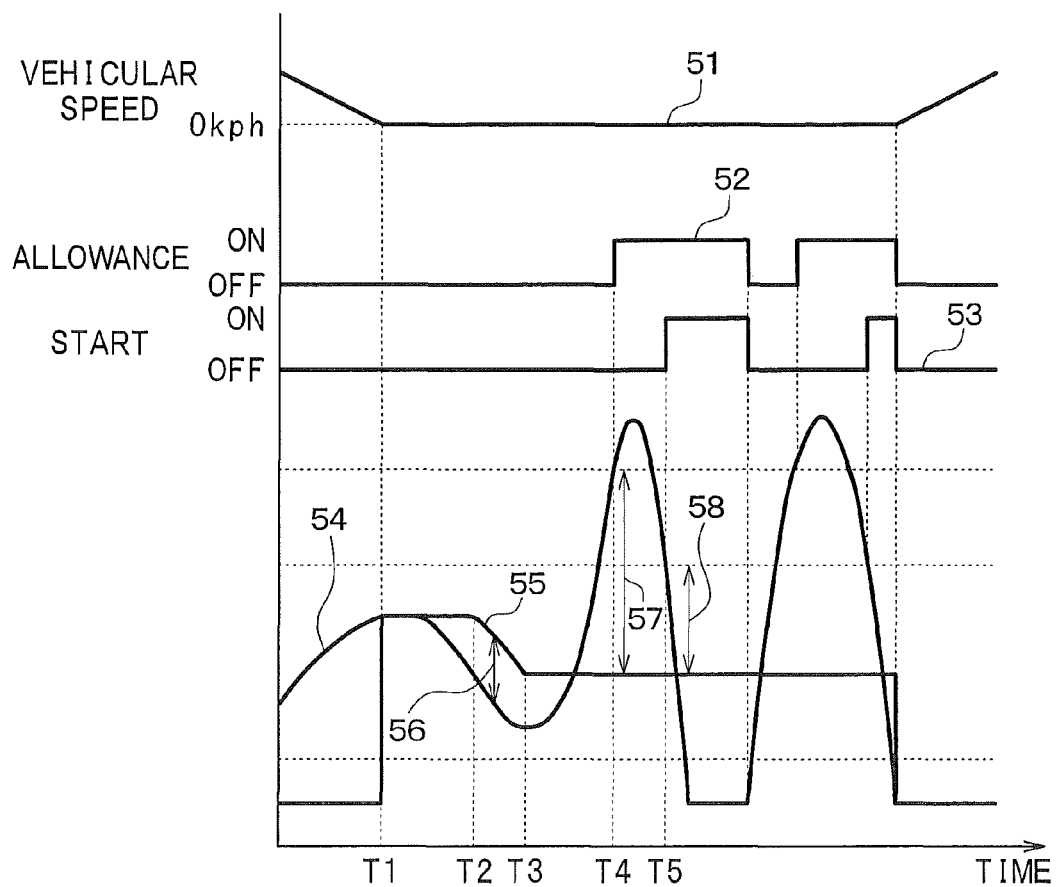
FIG. 14 is a timing chart showing various quantities in the case that the vehicle stops, the pressing force on the brake pedal is then reduced, the master cylinder pressure is accordingly reduced, and a stored value is updated.

FIG. 14 is a timing chart showing various quantities 51 to 55 in the case that the vehicle stops, the pressing force on the brake pedal BP is then reduced, the master cylinder pressure is accordingly reduced, and the stored value is updated.

As shown in FIG. 14, after the speed 51 of the vehicle becomes 0 km/h at time T1, the master cylinder pressure 54 is reduced and the stored value 55 is accordingly updated More specifically, after the stored value 55 becomes larger than the sum of the master cylinder pressure 54 and the third threshold 56 at time T2, the stored value 55 is updated in accordance with decrease of the master cylinder pressure 54. When the driver increases the pressing force on the brake pedal BP again at time T3 to execute the vehicular start aid control, the master cylinder pressure 54 increases and the stored value at time T3 is maintained.

Then, the brake ECU 10 allows the vehicular start aid control to start when the master cylinder pressure becomes larger than the sum of the stored value 55 and the first threshold 57 at time T4. Furthermore, the brake ECU 10 starts the vehicular start aid control when the master cylinder pressure 54 becomes smaller than the stored value 55 and the second threshold 58 at time T5.

Thus, the stored value is updated in accordance with decrease of the master cylinder pressure. Therefore, the vehicular start aid control can be properly executed even if the stored value once becomes equal to the master cylinder pressure when the brake pedal BP is pressed down with a strong force which makes it difficult for the driver to press the brake pedal BP further. In addition, the stored value does not become insufficiently small even if it is updated in accordance with the decrease of the master cylinder pressure. Therefore, the stored value always corresponds to a wheel cylinder pressure necessary for keeping the vehicle standing still or parked and it is accordingly possible to prevent the vehicle from sliding down on a slope.

Other Embodiment

In the above embodiments, an example of conduit structure of a vehicular brake control device having a hydraulic brake booster system is described. However, the present invention is applicable to any vehicular brake control device having another type of conduit structure which is well-known.

In the second embodiment, the brake ECU 10 calculates the first estimate for the wheel cylinder pressures and the second estimate for the wheel cylinder pressures based on the first filter and the second filter, respectively. Thus, the two estimates for the wheel cylinder pressures are calculated because temperature of the brake fluid (or, the viscous resistance of the brake fluid) is not estimated in the above embodiment. The first estimate is intended for high viscous resistance and the second estimate is intended for low viscous resistance.

However, if the brake ECU 10 can estimate the temperature of the brake fluid, the brake ECU 10 can use, in place of the first and second filters, a low-pass variable filter having a variable cutoff frequency which changes depending on the estimated temperature of the brake fluid. In this case, an estimate for the wheel cylinder pressure can be calculated wherein the estimate changes in variable response to the decrease of the master cylinder pressure. The variable response matches the viscous resistance of the brake fluid at the estimated temperature.

Figure 17:
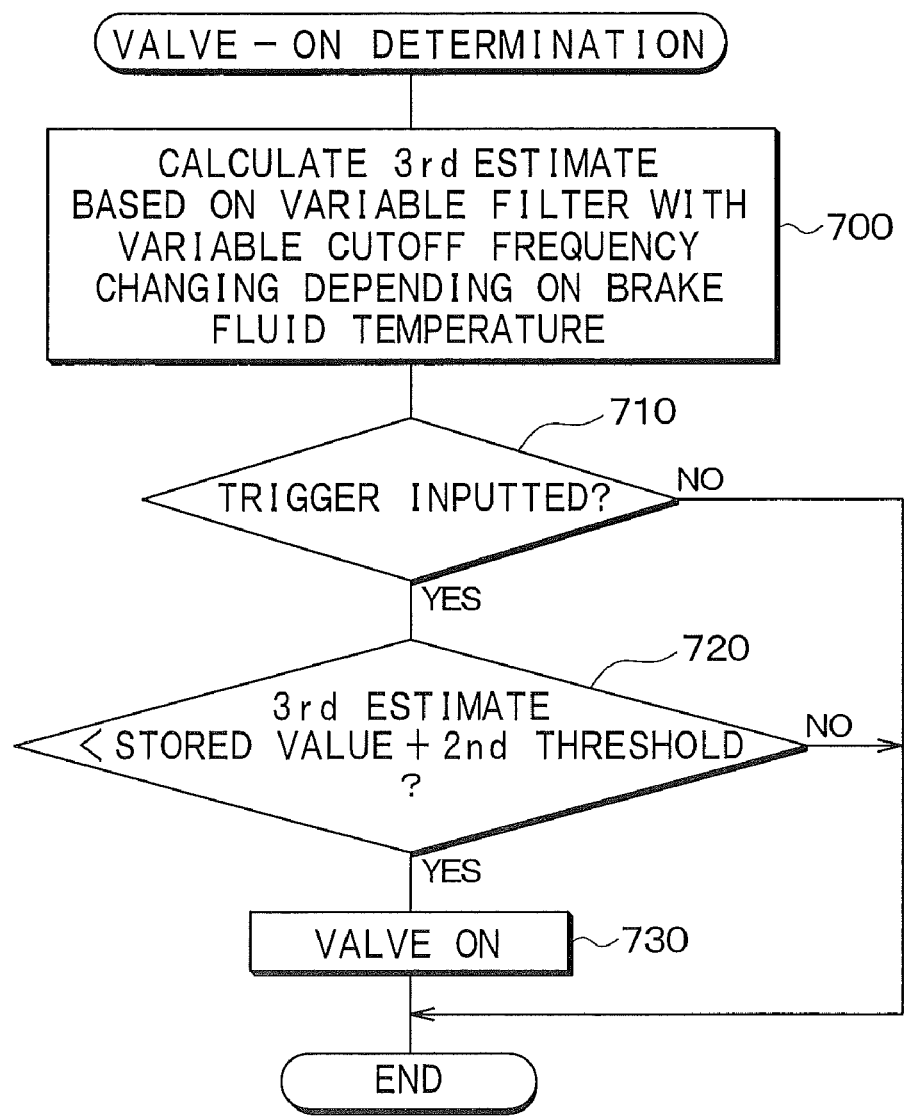
FIG. 17 is a flowchart showing details of the valve-on determination process according to another embodiment.

More specifically, the brake ECU 10 may execute the valve-on determination process shown in FIG. 17 in place of the valve-on determination process shown in FIG. 11. In this case, the brake ECU 10 imports at step 700 the detection signal (i.e. the original master cylinder pressure) from the pressure sensor 12 and passes it through the variable filter to calculate the third estimate for the wheel cylinder pressures. Then at step 710, the brake ECU 10 determines whether the trigger is inputted in the same manner as step 400 in FIG. 8. When the determination at step 710 becomes affirmative, the brake ECU 10 proceeds to step 720. At step 720, the brake ECU 10 determines whether the third estimate for the wheel cylinder pressures becomes smaller than the sum of the stored value and the second threshold. When the determination at step 720 becomes affirmative, the brake ECU 10 proceeds to step 730 to place an instruction for turning valves on and then ends the valve-on determination process at the present control cycle. If the determination at step 710 or 720 becomes negative, the brake ECU ends the valve-on determination process at the present control cycle.

With this operation, the brake ECU 10 can calculate correct estimate for the wheel cylinder pressures corresponding to the temperature (or viscous resistance) of the brake fluid by passing the detection signal from the pressure sensor 12 to the single filter. Then, the brake ECU 10 can detect that the brake pedal BP is returning toward the release position when the correct estimate becomes smaller than the sum of the stored value and the second threshold, as is done in the first embodiment. Therefore, an advantageous effect similar to that of the second embodiment is obtained with the single (not two) filter.

The temperature of the brake fluid is basically equal to air temperature at the exterior of the vehicular brake control device, in other words, equal to temperature of the environment in which the vehicular brake control device is used. Hereinafter, the air temperature at the exterior of the vehicular brake control device is referred to as external temperature. Therefore, the brake ECU 10 may import through an on-board LAN a detection signal from an external temperature sensor or import through on-board LAN the external temperature calculated according to the detection signal. In this case, the ECU 10 may determine the cutoff frequency of the filter based on the external temperature by using a function or a map which relates the external temperature to the cutoff frequency.

Figure 18:
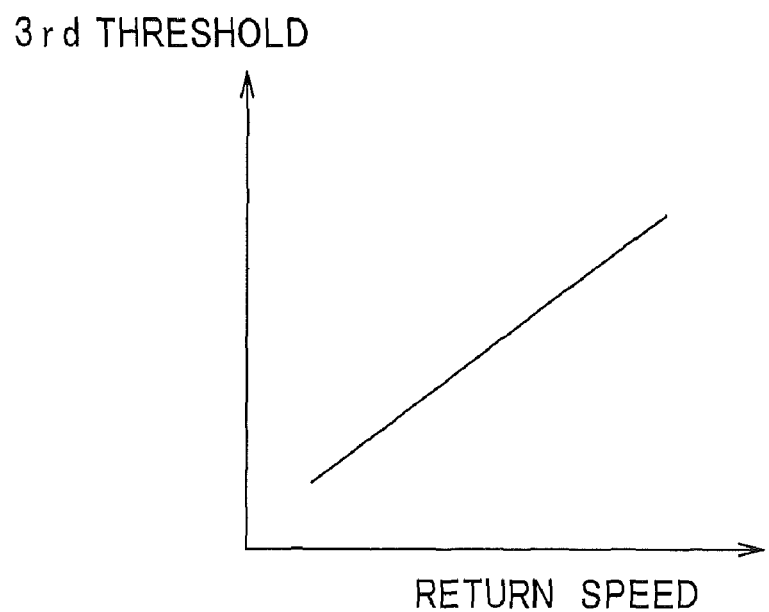
FIG. 18 is a graph showing relation between a return speed and a third threshold.

In the third embodiment, the stored value is updated in accordance with decrease of the master cylinder pressure so that the stored value becomes the sum of the master cylinder pressure and the third threshold, wherein the third threshold is constant. However, the third threshold may be varied depending on the speed of reduction of pressing force on the brake pedal BP, in other words, depending on how fast the brake pedal is returning toward the release position. Hereinafter, the speed of reduction of pressing force on the brake pedal BP is referred to as a return speed. More specifically, the third threshold may be determined to become larger as the return speed becomes larger as shown in FIG. 18. The reason is as follows. Although the master cylinder pressure decreases faster as the return speed becomes larger, the differences between the master cylinder pressure and the wheel cylinder pressures become larger as the return speed becomes larger. Therefore, it may take longer time until the vehicle starts running as the return speed becomes larger.

In the above embodiments, the brake ECU 10 uses two conditions for executing the vehicular start aid control. More specifically, the brake ECU 10 allows the vehicular start aid control to start when brake pedal BP is pressed further than when the vehicle stops, and the master cylinder pressure therefore increases. After that, the brake ECU 10 actually starts executing the vehicular start aid control when it is detected that the brake pedal BP is returning to the release position. In addition to this new way, this vehicular start aid control device executing the vehicular start aid control can detect that the brake pedal is being pressed down quickly and does not allow the vehicular start aid control to start if the brake pedal is not being pressed down quickly.

Conventionally, the vehicular start aid control is allowed to start and actually executed just when the master cylinder pressure increases by pressing the brake pedal BP further than when the vehicle stops. In addition to this conventional way, it may also be determined whether the brake pedal is being pressed down quickly, and the vehicular start aid control may be prohibited from starting until it is determined that the brake pedal is being pressed down quickly.

Figure 19:
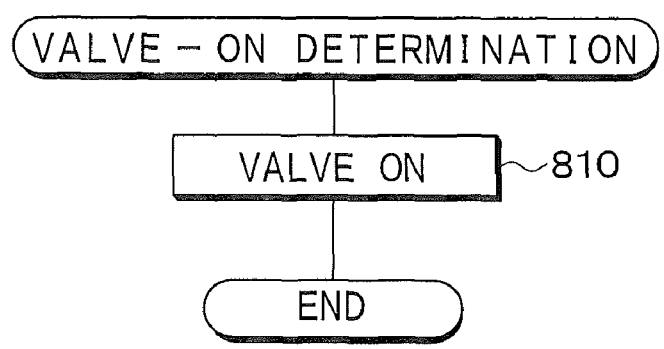
FIG. 19 is a flowchart showing details of the valve-on determination process according to still another embodiment.

More specifically, the brake ECU 10 may executes the valve-on determination process shown in FIG. 19 in place of the valve-on determination process shown in FIG. 8. In this case, on starting the valve-on determination process, the brake ECU 10 simply places at step 810 an instruction for turning valves on as is done in step 420 in FIG. 8 and then ends the valve-on determination process at the present control cycle.

In the first embodiment, the gradient of the master cylinder pressure is compared with the fourth threshold in step 301, wherein the fourth threshold is a constant. However, the fourth threshold may vary depending on the pressing force applied to the brake pedal BP. When a large pressing force is being applied to the brake pedal BP, the amount of the additional pressing force which can be further applied to the brake pedal BP is small. Therefore in this case, the gradient of the master cylinder possibly becomes small. Therefore, if the fourth threshold is determined according to the pressing force, it is possible to determine whether the brake pedal BP is being pressed down quickly in a manner suitable for the pressing force currently being applied to the brake pedal BP.

Figure 15:
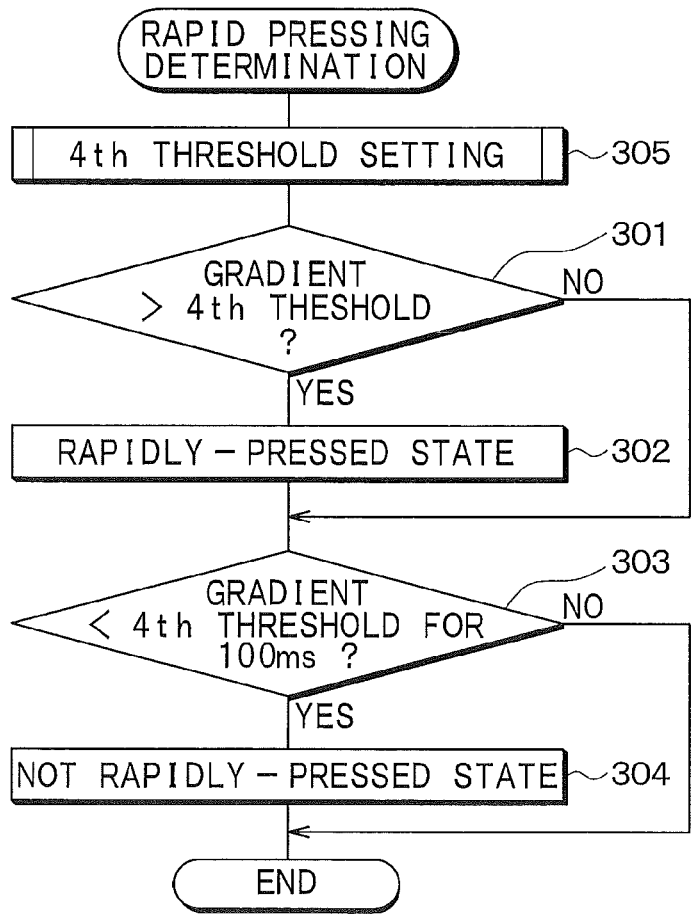
FIG. 15 is a flowchart showing a rapid pressing determination process including a fourth threshold setting process according to another embodiment.
Figure 16:
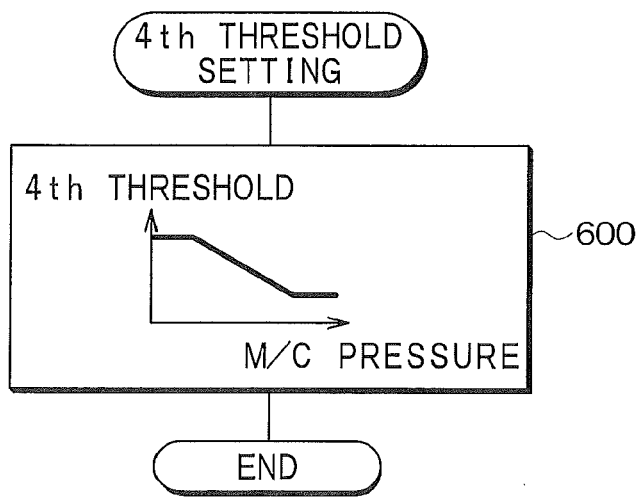
FIG. 16 is a flowchart showing details of the fourth threshold setting process in FIG. 15.

FIG. 15 is a flowchart showing the rapid pressing determination process including a fourth threshold setting process in which the fourth threshold is determined. FIG. 16 is a flowchart showing details of the fourth threshold setting process.

The rapid pressing determination process is executed in place of the process shown in FIG. 7. More specifically, the brake ECU 10 executes the fourth threshold setting process in step 305 before executing the process at step 301. In the fourth threshold setting process, the fourth threshold is determined based on the pressing force on the brake pedal BP at step 600 in FIG. 16. In this case, the master cylinder pressure is used as an example of a physical quantity corresponding to the pressing force applied on the brake pedal BP, and the fourth threshold is determined based on the master cylinder pressure. More specifically, the fourth threshold is set to be smaller as the master cylinder pressure becomes larger based on the map shown in step 600, wherein the map defines relation between the master cylinder pressure and the fourth threshold. However, it is not preferable to allow the fourth threshold to change under no restriction because there is a suitable range for the fourth threshold. Therefore, the upper limit and the lower limit of the fourth threshold (rapidly-pressed threshold) is defined, and the brake ECU 10 determines the fourth threshold to be equal to the upper limit when the master cylinder pressure is equal to or smaller than the first pressure and also determines the fourth threshold to be equal to the lower limit when the master cylinder pressure is equal to or larger than the second pressure, wherein the second pressure is larger than the first pressure.

Thus, it is possible to determine the fourth threshold based on the pressing force on the brake pedal BP by setting the fourth threshold based on the master cylinder pressure. With this operation, the rapid pressing determination is executed in accordance with the pressing force on the brake pedal BP.

In the above embodiments, a vehicular start aid control device is composed of the vehicular brake control device having a hydraulic brake booster system. However, the present invention is applicable to any vehicular start aid control device composed of another type of vehicular brake control device having, for example, a vacuum booster.

Each of the steps in the figures corresponds to a means for executing the process in the step. For example, a section of the brake ECU 10 executing step 100 serves as an example of a stop determination means, a section of the brake ECU 10 executing step 110 serves as an example of a memorizing means, a section of the brake ECU 10 executing step 130 serves as an example of a start determination means, a section of the brake ECU 10 executing step 300 serves as an example of a rapid pressing determination means, and a section of the brake ECU 10 executing steps 310 and 320 serves as an example of an allowance determination means.

What is claimed is:

1. A brake force maintain control device for a vehicle, comprising:
    a pressure obtaining means for obtaining a master cylinder pressure which is generated in a master cylinder in accordance with a pressing force applied to a brake pedal of the vehicle;
    a stop determination means for determining whether the vehicle has stopped;
    a rapid pressing determination means for making a rapidly-pressed determination as to whether the vehicle is in a rapidly-pressed state based on an increase rate of the master cylinder pressure, wherein the rapidly-pressed state is a state in which the brake pedal has been further pressed rapidly; and
    an allowance determination means for allowing execution of a brake force maintain control when both of first and second conditions are satisfied, the first condition being that the rapid pressing determination means determines that the vehicle is in the rapidly-pressed state after the stop determination means determines that the vehicle has stopped, the second condition being that the master cylinder pressure obtained by the pressure obtaining means is larger than a predetermined value, wherein the brake force maintain control is for maintaining brake fluid pressures generated at wheel cylinders for wheels of the vehicle;
    wherein;
    the rapid pressing determination means defines a rapidly-pressed threshold so that the rapidly-pressed threshold becomes smaller as the pressing force applied to the brake pedal becomes larger; and
    the rapid pressing determination means determines that the vehicle is in the rapidly-pressed state when the increase rate of the master cylinder pressure is larger than the rapidly-pressed threshold.

2. The brake force maintain control device according to claim 1, wherein:
    the rapid pressing determination means keeps the rapidly-pressed determination affirmative for a first predetermined time once the rapidly-pressed determination changes to affirmative; and
    the second condition is that the master cylinder pressure obtained by the pressure obtaining means has been continuously larger than the predetermined value for a second predetermined time which is shorter than the first predetermined time.

3. The brake force maintain control device according to claim 1, further comprising a start determination means for determining to start executing the brake force maintain control on detecting that the pressing force applied to the brake pedal is reduced after the allowance determination means allows execution of the brake force maintain control.

4. The brake force maintain control device according to claim 3, further comprising a memorizing means for memorizing, as a stored value, the master cylinder pressure obtained by the pressure obtaining means when the vehicle stops,
    wherein the start determination means detects reduction of the pressing force on the brake pedal based on the stored value and the master cylinder pressure, the master cylinder pressure being obtained after the stored value is memorized.

5. The brake force maintain control device according to claim 4, wherein:
    the second condition is that the master cylinder pressure obtained by the pressure obtaining means is larger than a sum of the stored value and a first threshold; and
    the start determination means detects the reduction of the pressing force on the brake pedal by detecting that the master cylinder pressure obtained by the pressure obtaining means becomes smaller than a sum of the stored value and a second threshold, the second threshold being smaller than the first threshold.

6. The brake force maintain control device according to claim 4, wherein:
    the second condition is that the master cylinder pressure obtained repeatedly once per a control cycle by the pressure obtaining means is larger than a sum of the stored value and a first threshold;
    the start determination means passes a signal of the obtained master cylinder pressure through a first filter having a first cutoff frequency;
    the start determination means calculates a fist estimate for wheel cylinder pressures based on the signal of the obtained master cylinder pressure which has been passed through the first filter; and
    the start determination means detects the reduction of the pressing force on the brake pedal by detecting that the first estimate becomes smaller than a sum of the stored value and an anti-containment threshold, the anti-containment threshold being smaller than the first threshold.

7. The brake force maintain control device according to claim 6, wherein:
    the start determination means passes the signal of the obtained master cylinder pressure through a second filter having a second cutoff frequency, the second cutoff frequency being larger than the first cutoff frequency;
    the start determination means calculates a second estimate for the wheel cylinder pressures based on the signal of the obtained master cylinder pressure which has been passed through the second filter; and
    the start determination means detects the reduction of the pressing force on the brake pedal by detecting that the second estimate becomes smaller than a sum of the stored value and an anti-sliding threshold, the anti-sliding threshold being smaller than the anti-containment threshold.

8. The brake force maintain control device according to claim 4, wherein:
    the second condition is that the master cylinder pressure obtained by the pressure obtaining means is larger than a sum of the stored value and a first threshold;
    the start determination means passes a signal of the obtained master cylinder pressure through a variable filter having a variable cutoff frequency; the variable cutoff frequency changing depending on temperature of brake fluid of the vehicle, the start determination means calculates an estimate for wheel cylinder pressures based on the signal of the obtained master cylinder pressure which has been passed through the variable filter; and the start determination means detects the reduction of the pressing force on the brake pedal by detecting that the estimate becomes smaller than a sum of the stored value and a second threshold, the second threshold being smaller than the first threshold.

9. The brake force maintain control device according to claim 4, wherein the memorizing means updates the stored value in accordance with decrease of the master cylinder pressure when the master cylinder pressure decreases while the vehicle is not moving.

10. The brake force maintain control device according to claim 9, wherein the memorizing means updates the stored value to a sum of the master cylinder pressure and a third threshold when the stored value is larger than the sum of the master cylinder pressure and the third threshold.

11. The brake force maintain control device according to claim 10, wherein the third threshold becomes larger as a return speed becomes larger, the return speed being a speed of reduction of pressing force on the brake pedal.

12. The brake force maintain control device according to claim 1, which starts executing the brake force maintain control when the allowance determination means allows execution of the brake force maintain control.

13. A brake force maintain control device for a vehicle, comprising:
a pressure obtaining means for obtaining a master cylinder pressure which is generated in a master cylinder in accordance with a pressing force applied to a brake pedal of the vehicle;
a stop determination means for determining whether the vehicle has stopped;
a rapid pressing determination means for making a rapidly-pressed determination as to whether the vehicle is in a rapidly-pressed state based on an increase rate of the master cylinder pressure, wherein the rapidly-pressed state is a state in which the brake pedal has been further pressed rapidly; and
an allowance determination means for allowing execution of a brake force maintain control when both of first and second conditions are satisfied, the first condition being that the rapid pressing determination means determines that the vehicle is in the rapidly-pressed state after the stop determination means determines that the vehicle has stopped, the second condition being that the master cylinder pressure obtained by the pressure obtaining means is larger than a predetermined value, wherein the brake force maintain control is for maintaining brake fluid pressures generated at wheel cylinders for wheels of the vehicle,
wherein:
the rapid pressing determination means keeps the rapidly-pressed determination affirmative for a first predetermined time once the rapidly-pressed determination changes from negative to affirmative;
the second condition is that the master cylinder pressure obtained by the pressure obtaining means has been continuously larger than the predetermined value for a second predetermined time which is shorter than the first predetermined time;
the rapid pressing determination means defines a rapidly-pressed threshold so that the rapidly-pressed threshold becomes smaller as the pressing force applied to the brake pedal becomes larger; and the rapid pressing determination means determines that the vehicle is in the rapidly-pressed state when the increase rate of the master cylinder pressure is larger than the rapidly-pressed threshold.

14. The brake force maintain control device according to claim 13, further comprising a start determination means for determining to start executing the brake force maintain control on detecting that the pressing force applied to the brake pedal is reduced after the allowance determination means allows execution of the brake force maintain control.

15. The brake force maintain control device according to claim 14, further comprising a memorizing means for memorizing, as a stored value, the master cylinder pressure obtained by the pressure obtaining means when the vehicle stops,
wherein the start determination means detects reduction of the pressing force on the brake pedal based on the stored value and the master cylinder obtained after the stored value is memorized.

16. The brake force maintain control device according to claim 15, wherein:
the second condition is that the master cylinder pressure obtained by the pressure obtaining means is larger than a sum of the stored value and a first threshold; and
the start determination means detects the reduction of the pressing force on the brake pedal by detecting that the master cylinder pressure obtained by the pressure obtaining means becomes smaller than a sum of the stored value and a second threshold, the second threshold being smaller than the first threshold.

17. The brake force maintain control device according to claim 16, wherein:
the second condition is that the master cylinder pressure obtained repeatedly once per a control cycle by the pressure obtaining means is larger than a sum of the stored value and a first threshold;
the start determination means passes a signal of the obtained master cylinder pressure through a first filter having a first cutoff frequency;
the start determination means calculates a fist estimate for wheel cylinder pressures based on the signal of the obtained master cylinder pressure which has been passed through the first filter;
the start determination means detects the reduction of the pressing force on the brake pedal by detecting that the first estimate becomes smaller than a sum of the stored value and an anti-containment threshold, the anti-containment threshold being smaller than the first threshold;
the start determination means passes the signal of the obtained master cylinder pressure through a second filter having a second cutoff frequency, the second cutoff frequency being larger than the first cutoff frequency;
the start determination means calculates a second estimate for the wheel cylinder pressures based on the signal of the obtained master cylinder pressure which has been passed through the second filter; and
the start determination means detects the reduction of the pressing force on the brake pedal by detecting that the second estimate becomes smaller than a sum of the stored value and an anti-sliding threshold, the anti-sliding threshold being smaller than the anti-containment threshold.

18. The brake force maintain control device according to claim 15, wherein:
the second condition is that the master cylinder pressure obtained by the pressure obtaining means is larger than a sum of the stored value and a first threshold;

the start determination means passes a signal of the obtained master cylinder pressure through a variable filter having a variable cutoff frequency; the variable cutoff frequency changing depending on temperature of brake fluid of the vehicle, the start determination means calculates an estimate for wheel cylinder pressures based on the signal of the obtained master cylinder pressure which has been passed through the variable filter; and the start determination means detects the reduction of the pressing force on the brake pedal by detecting that the estimate becomes smaller than a sum of the stored value and a second threshold, the second threshold being smaller than the first threshold.

19. The brake force maintain control device according to claim 18, wherein the memorizing means updates the stored value in accordance with decrease of the master cylinder pressure when the master cylinder pressure decreases while the vehicle is not moving;

the memorizing means updates the stored value to a sum of the master cylinder pressure and a third threshold when the stored value is larger than the sum of the master cylinder pressure and the third threshold; and the third threshold becomes larger as a return speed becomes larger, the return speed being a speed of reduction of pressing force on the brake pedal.

* * * * *